(12) United States Patent
Adkins et al.

(10) Patent No.: US 7,284,019 B2
(45) Date of Patent: Oct. 16, 2007

(54) APPARATUS, SYSTEM, AND METHOD FOR DIFFERENTIAL BACKUP USING SNAPSHOT ON-WRITE DATA

(75) Inventors: Janet Elizabeth Adkins, Austin, TX (US); Joon Chang, Austin, TX (US); Neeta Garimella, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 10/920,964

(22) Filed: Aug. 18, 2004

(65) Prior Publication Data

US 2006/0041727 A1   Feb. 23, 2006

(51) Int. Cl.
*G06F 17/30* (2006.01)
*G06F 12/00* (2006.01)

(52) U.S. Cl. ............... 707/202; 707/204; 711/112; 711/162; 711/202

(58) Field of Classification Search ............. 707/1–10, 707/102, 200, 201, 202, 204; 709/203, 217; 711/154, 161, 162; 714/6; 719/328
See application file for complete search history.

(56) References Cited

U.S. PATENT DOCUMENTS

| | | | |
|---|---|---|---|
| 5,210,866 A | 5/1993 | Milligan et al. | ............. 395/575 |
| 5,454,099 A | 9/1995 | Myers et al. | ............... 395/575 |
| 5,758,067 A | 5/1998 | Makinen et al. | ........ 395/185.07 |
| 5,765,173 A | 6/1998 | Cane et al. | ................. 707/204 |
| 6,397,308 B1 * | 5/2002 | Ofek et al. | ................. 711/162 |
| 6,615,225 B1 | 9/2003 | Cannon et al. | ............. 707/204 |
| 2003/0163493 A1 | 8/2003 | Burns et al. | ................ 707/204 |
| 2003/0182301 A1 | 9/2003 | Patterson et al. | ........... 707/102 |

OTHER PUBLICATIONS

Kim et al., Snapshot Technique Using Snapshot Status Table for Shared Storage Supporting Large Capacity, Feb. 10, 2004, Advance Communication Technology, 6th International Conference vol. 2, pp. 677-682.*

(Continued)

*Primary Examiner*—Cam Y Truong
*Assistant Examiner*—Fred I Ehichioya
(74) *Attorney, Agent, or Firm*—Kunzler & McKenzie

(57) ABSTRACT

An apparatus, system, and method are disclosed for differential data backup using snapshot on-write data. A snapshot module maintains an on-write data structure that captures a point-in-time or temporal instance of a data set by tracking modifications to data blocks of a data set. A backup module copies the data set to a backup data storage device as a full data set backup. In addition, the backup module copies each modified data block indicated by the on-write data structure and a differential time stamp to the backup data storage device as a differential data set backup. The full data set backup and one or more differential data set backups form a plurality of temporal instances of the data set. In one embodiment, a restore module recovers a selected instance of the data set responsive to receiving a restore command by copying the full data set backup to a target data storage device. In addition, the restore module may copy the differential data set backup to the target data storage device if the differential time stamp corresponds to a target time value.

23 Claims, 19 Drawing Sheets

OTHER PUBLICATIONS

Qian C. et al; "Optimal Backup Policies for a Database System with Incremental Backup", INSPEC: (AN-7224444), 2002.

"Data backup Method for reconciling file system to point in time using incremental backup data stored on storage management server involves reconciling query to identify file system changes made between from Date and to Date", Research Disclosure RD-430120-A (Feb. 10, 2001).

Cox, LP. et al.; Pastiche: "Making Backup Cheap and Easy", USENIX Association 5th Symposium on Operating Systems Design and Implementation, 2002, p. 285-298.

Lee, EK et al.; Petal: "Distributed Virtual Disks", ASPLOS VII Oct. 1996, p. 84-92.

Nakamura, S; "Optimal full backup intervals for the incremental backup method", INSPEC; (AN-6775249), 2000.

* cited by examiner

APPARATUS, SYSTEM, AND METHOD FOR DIFFERENTIAL BACKUP USING SNAPSHOT ON-WRITE DATA

BACKGROUND OF THE INVENTION

1. Field of the Invention

This invention relates to data backup and more particularly relates to differential data backup using point-in-time snapshot data.

2. Description of the Related Art

Data processing systems often employ a snapshot module to facilitate data storage and retrieval operations. The snapshot module tracks writes to a data set on an active data storage device, creating a point-in-time instance of the data set. The active data storage device may be a memory such as the data processing system's memory, or a hard disk drive. The snapshot module creates the point-in-time instance of the data set of the active data storage device and uses the point-in-time instance to perform operations on the data set. For example, the snapshot module may mirror a point-in-time instance of the data set to an alternate data storage device by copying to the alternate data storage device only the data blocks of the data set that have been modified.

The snapshot module monitors and tracks the modified data blocks as write information such as a write record. The write record identifies a modified data block. In one embodiment, the snapshot module reduces the bandwidth of storing the data set from the active data storage system by storing only the data blocks that the snapshot module identifies as having been modified. For example, the data processing system may retrieve a data set from a source data storage device such as a storage server to an active data storage device such as a memory or a hard disk drive. The data processing device modifies data blocks of the data set stored on the active data storage device. The snapshot module tracks the data blocks of the data set that have been modified and creates a point-in-time instance of the modified data set. The snapshot module may store the point-in-time instance to the source data storage device by copying only the modified data blocks back to the source data storage device. The bandwidth required to store the data set is reduced as fewer data blocks are copied as only modified data blocks are copied.

In another example, the data processing system may retrieve a data set that includes ten (10) data blocks from the source data storage device to the active data storage device. If the data processing system only modifies the first data block on the active data storage device, the snapshot module can create an instance of the modified data set on the source data storage device by only copying the modified first data block to the source data storage device as the other nine data blocks are unmodified. The snapshot module uses the on-write data structure to identify the modified data blocks such as the first data block. By copying only the modified data blocks, the bandwidth required for copy operations is reduced.

An important copy operation is data backup. Data storage devices must be regularly backed up to protect valuable data from loss due to hardware failure or data corruption. For example, the data storage devices storing transaction data for a business may be backed up repeatedly because of the high cost of losing any of the transactions. The data backup of the data storage devices often requires significant storage. A user may desire not only to backup the current instance of a data set, but also may desire to backup and maintain a plurality of instances of the data set so that the data set may be recovered from a plurality of points in time.

Unfortunately, storing the plurality of backup instances may require additional data storage capacity that is far in excess of the size of the data set that must be backed up, particularly if the data set is backed up frequently and if each backup instance is stored for an extended time. For example, backing up a data set every minute would require storing one thousand four hundred and forty (1440) instances of the data set each day. Yet the storage requirements for the plurality of backup instances could be reduced if point-in-time instances of the modified data blocks of the data set could be backed up. Backing up only modified data blocks significant reduces the bandwidth and storage requirements of backup operations. In addition, the snapshot module already maintains the required information on modifications to data blocks for each point-in-time instance.

From the foregoing discussion, it should be apparent that a need exists for an apparatus, system, and method that employs snapshot module on-write data to create multiple temporal instances of a data set as differential data set backups. Beneficially, such an apparatus, system, and method would improve the efficiency of data backups.

SUMMARY OF THE INVENTION

The present invention has been developed in response to the present state of the art, and in particular, in response to the problems and needs in the art that have not yet been fully solved by currently available data backup systems. Accordingly, the present invention has been developed to provide an apparatus, system, and method for differential data backup that overcome many or all of the above-discussed shortcomings in the art.

The apparatus to backup data is provided with a logic unit containing a plurality of modules configured to functionally execute the necessary steps of data backup. These modules in the described embodiments include a block size module, snapshot module, an on-write data structure, a backup module and a restore module. The snapshot module creates the on-write data structure that used by the backup module to backup data. The snapshot module monitors writes to portions of the data set referred to herein as data blocks. In one embodiment, the block size module determines the data block size of the data blocks of the on-write data structure. For example, the block size module may select the data block size as the data block size of the active data storage device.

A data set resides on the active data storage device. The snapshot module tracks the writes to the data blocks of the data set by recording a write record to the on-write data structure. In one embodiment, the snapshot module records the write record for the first write to a data block. The write record indicates that the data block has been modified for a given point in time or temporal instance of the data set. In a certain embodiment the snapshot module only records the write record for the first write to the data block for each point in time or temporal instance of the data set.

The write record may include a data block identifier. For example, the snapshot module may record a write record in the on-write data structure for a first data block as data is written to the first data block of the data set in the active data storage device. The write record includes the data block identifier of the first data block. The snapshot module records the write record for a write such as the first write to each data block of the active data storage device in the on-write data structure. In one embodiment, the on-write data structure is organized as an array of write record arrays. In an alternate embodiment, the on-write data structure is organized as an array of linked lists. In one embodiment, the snapshot module performs one or more functions independent of the backup module and the restore module of the apparatus. For example, the snapshot module may mirror data from the active data storage device using the on-write data structure.

The backup module backs up the data set of the active data storage device using the on-write data structure of the snapshot module. In one embodiment, the backup module copies the data set from the active data storage device to a backup data storage device. The copied data set is a full data set backup. The data set remains accessible on the active data storage device as the backup module copies the data set to the backup data storage device. In a certain embodiment, the full data set backup includes a full data time stamp.

In addition, the backup module copies a first differential time stamp and a data block indicated by the data block identifier of the recorded write record to the backup data storage device as a first differential data set backup subsequent to the full data set backup. For example, the backup module may copy the data set to the backup data storage device as a full data set backup. Subsequent to the full data set backup, a data processing device may write to the first data block in the data set. The snapshot module records a write record that includes the data block identifier of first data block. The backup module copies the first differential time stamp and the first data block to the backup storage location as the first differential data set backup.

The restore module also recovers one or more instances the active data set responsive to receiving a restore command. In one embodiment, the restore command is a user command. The restore command includes a data set identifier identifying the data set to be recovered and a target time value specifying the temporal instance of the data set. The restore module copies the full data set backup to a target data storage device. In addition, the restore module determines if the target time value is subsequent to or equal to the first differential time stamp. If the target time value is subsequent or equal to the first differential time stamp, the restore module copies the data block of the first differential data set backup to the target data storage device overlaying the corresponding data block of the full data set backup.

A system of the present invention is also presented to backup data. The system may be embodied storage system. In particular, the system, in one embodiment, includes an active data storage device, a backup data storage device, a block size module, a snapshot module, an on-line data structure, a backup module, and a restore module. The active data storage device comprises a data set. The active data storage device maybe a hard disk drive, an array of disk drives, a dynamic random access memory ("DRAM") or the like. The snapshot module tracks writes to data blocks of the active data storage device in the on-write data structure. The backup module employs the on-write data structure to perform a differential backup and restore of the active data storage device.

The backup module creates one or more temporal instances of the data set as backup copies by copying the data set of the active data storage device to the backup data storage device as the full data set backup. In one embodiment, the backup data storage device is a portion of the active data storage device. In an alternate embodiment, the backup data storage device is a separate data storage device. The backup module further copies one or more selected data blocks of the data set and a first differential time stamp to a first differential data set backup. The copied data blocks are selected from the write records of the on-write data structure. The full data set backup and the first differential data set backup form a plurality of temporal instances of the data set.

The restore module recovers the data set to a target data storage device in response to the restore command. The target data storage device may be the active data storage device. The restore module copies the full data set backup to the target data storage device. In addition, if the target time value of the restore command is subsequent to or equal to the first differential time stamp, the restore module copies the data block of the first differential data set backup to the target data storage device overlaying the corresponding data block of the full data set backup.

A method of the present invention is also presented for data backup. The method in the disclosed embodiments substantially includes the steps necessary to carry out the functions presented above with respect to the operation of the described apparatus and system. The block size module determines a data block size for a write record of an on-write data structure for the data of the active data storage device. In one embodiment, the data block size is the data block size of an active data storage device.

The snapshot module maintains the on-write data structure comprising a write record for a write to a data block of the active data storage device. The write record comprises a data block identifier. The backup module copies the data set to a backup data storage device as a full data set backup. The data set remains accessible on the active data storage device while copied. The backup module further records a write record for a write to a data block of the active data storage device in the on-write data structure. The backup module copies each data block indicated by the data block identifier of each recorded write record to a backup data storage device as a first differential data set backup. In addition, the method includes a first differential time stamp in the first differential data set backup.

The restore module restores the data set to a target data storage device upon receiving a restore command. The restore command comprises a data set identifier and a target time value. The target time value indicates the temporal instance of the data set to be recovered while the data set identifier indicates the data set to be recovered. The method copies the full data set backup to a target data storage device. In addition, the method copies the data block of the first differential data set backup to the target data storage device overlaying the corresponding data block of the full data set backup if the target time value is subsequent to or equal to the first differential time stamp to restore.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention employs the on-write data structure of a snapshot module to create a differential data set backup. The present invention further preserves on-write information in the differential data set backup to create multiple temporal instances of the data set and reduces the data that is stored for backing up multiple temporal instances of a data set. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
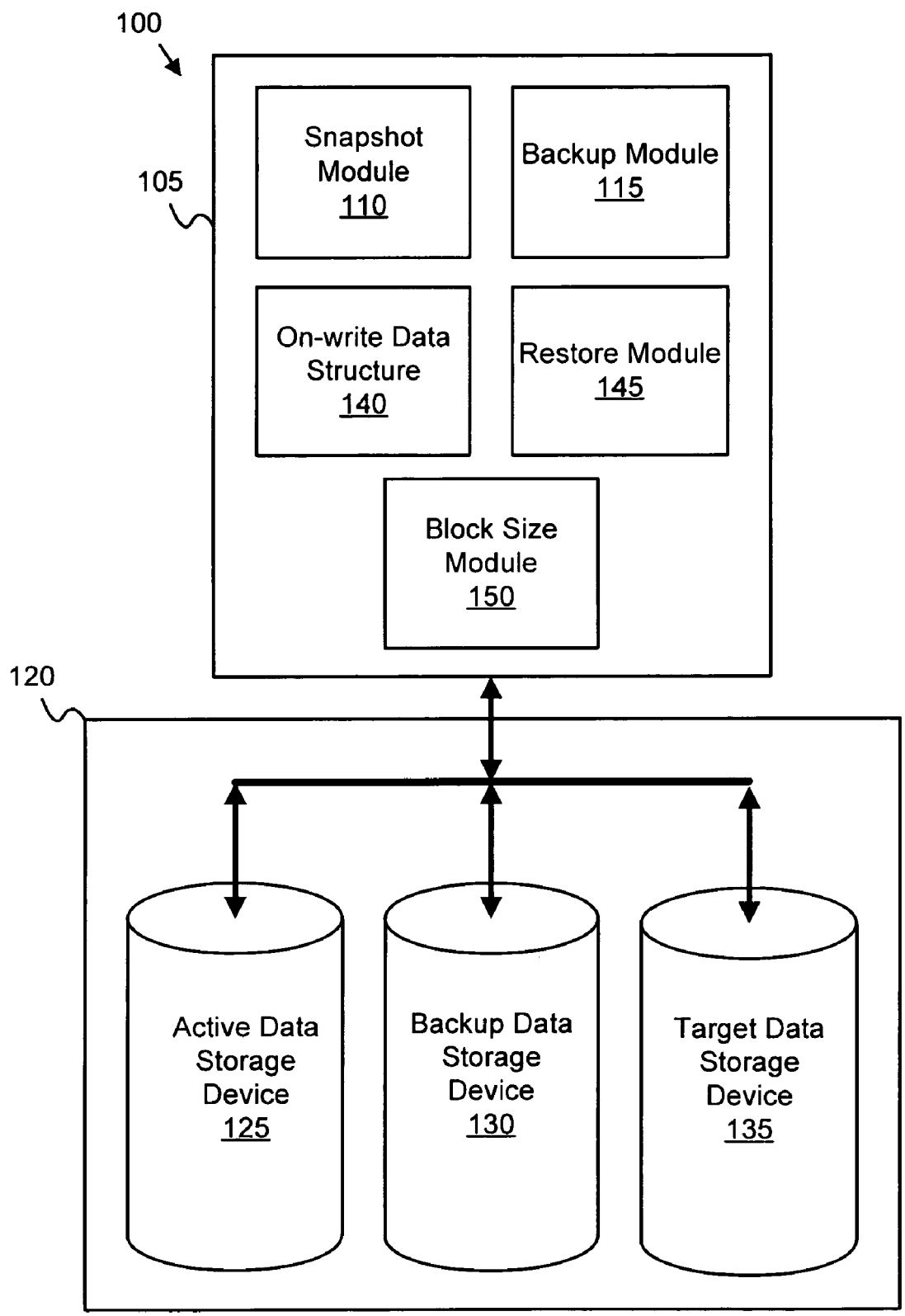
FIG. 1 is a schematic block diagram illustrating one embodiment of a data backup system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a data backup system 100 in accordance with the present invention. The data backup system 100 includes a block size module 150, a snapshot module 110, a backup module 115, an on-write data structure 140, a restore module 145, an active data storage device 125, a backup data storage device 130, and a target data storage device 135. In one embodiment, the active data storage device 125, the backup data storage device 130, and the target data storage device 135 are included in a single storage system 120. In an alternate embodiment, the active data storage device 125, the backup data storage device 130, and the target data storage device 135 are included in one or more storage systems 120.

In a certain embodiment, the backup data storage device 130 is a portion of the active data storage device 125. In an alternate embodiment, the backup data storage device 130 is a separate data storage device. In one embodiment, the data processing device 105 comprises the snapshot module 110, the on-line data structure 140, the backup module 115, and the restore module 145. The data processing device 105 may be a storage system controller, a storage server, and a computer.

The snapshot module 110 creates the on-write data structure 140 that is used by the backup module 115 to backup data. In one embodiment, the block size module 150 determines the data block size of the on-write data structure. The snapshot module 110 may also perform additional functions unrelated to data backup. For example, snapshot module 110 may mirror data from the active data storage device 125 using the on-write data structure 140. The snapshot module 110 monitors writes to portions of a data set referred to herein as data blocks. The data set resides on the active data storage device 125.

The snapshot module 110 tracks the writes to the data blocks by recording a write record to the on-write data structure 140. In one embodiment, the snapshot module 110 records the write record for the first write to a data block. The write record indicates that the data block has been modified for a given point in time or temporal instance of the data set. In a certain the snapshot module 110 only records the write record for the first write to the data block for each point in time or temporal instance of the data set.

The write record comprises a data block identifier. For example, the snapshot module 110 may record a write record in the on-write data structure 140 for a first data block as data is written to the first data block of the data set in the active data storage device 125. The write record includes the data block identifier of the first data block. The snapshot module 110 records the write record for a write such as the first write to each data block of the active data storage device 125 in the on-write data structure 140. In one embodiment, the on-write data structure 140 is organized as an array of write records. In an alternate embodiment, the on-write data structure 140 is organized as an array of linked lists comprising write records.

In one embodiment, the snapshot module 110 tracks data blocks that are added to the data set or deleted from the data set. For example, if a data block is added to the data set, the snapshot module 110 will record a write record for the added data block. In addition, the snapshot module 110 will track subsequent writes to the added data block for subsequent temporal instances of the data set. In an alternate example, the snapshot module 110 may record a write record indicating that a data block has been deleted.

In a certain embodiment, the block size module 150 selects the data block size of data blocks in the active data storage device 125 as the data block size for the on-write data structure 140. For example, if the active data device 125 stores data in four-kilobyte (4 KB) data blocks, the block size module 150 may select four-kilobyte (4 KB) data blocks for the on-write data structure 140. In an alternate embodiment, the block size module 150 selects the data block size that provides a target granularity for the data set. For example, the block size module 150 may select a target granularity of two thousand forty-eight (2048) data blocks for the data set and thus select a four kilobyte (4 KB) data block size if the data set contains approximately eight billion, five hundred eighty nine million, nine hundred thirty four thousand, and five hundred and ninety-two (8,589,934, 592) bytes.

The backup module 115 backs up the data set of the active data storage 125 device using the on-write data structure 140 of the snapshot module 110. The backup module 115 copies the data set from the active data storage device 125 to the backup data storage device 130. The copied data set is a full data set backup. In a certain embodiment, the full data set backup includes a full data time stamp.

In one embodiment, the data set remains accessible on the active data storage device 125 as the backup module 115 copies the data set to the backup data storage device 130. The snapshot module 110 may make the data set on the active data storage device 130 accessible by identifying a temporal instance of the data set that will be copied for the backup module 115. For example, the snapshot module 110 may identify a specified temporal instance of a data set. The specified temporal instance identifies modified data blocks. The backup module 115 can copy the modified data blocks of the specified temporal instance while the data set is being further modified as the snapshot module 110 maintains a record the specified temporal instance in the on-write data structure. In a certain embodiment, the snapshot module 110 mirrors the specified temporal instance of the modified data blocks in the data set before the backup module 115 copies the mirrored modified data blocks.

In addition, the backup module 115 creates a first differential data set backup subsequent to the full data set backup. The backup module 115 copies a first differential time stamp and each data block indicated by the data block identifier of each recorded write record of the on-write data structure to the backup data storage device 130 as a first differential data set backup.

For example, the backup module 115 may copy the data set to the backup data storage device 130. Subsequent to the full data set backup, a data processing device may write to the first data block in the data set. The snapshot module 110 records a write record in the on-write data structure 140 that includes the data block identifier of first data block. The backup module 115 copies the first differential time stamp and the first data block to the backup storage device 130 as the first differential data set backup. In one embodiment, the backup module 115 directs the snapshot module 110 to clear the write records of the on-write data structure 140 subsequent to creating each full data set backup and each differential data set backup. In an alternate embodiment, the backup module 115 directs the snapshot module 110 to clear the write records of the on-write data structure 140 subsequent to each full data set backup.

In one embodiment, the backup module 115 creates a second differential data set backup by copying a second differential time stamp and each data block indicated by the data block identifier of each recorded write record of the on-write data structure 140 to the backup data storage device 130. The first and the second differential data set backups represent different temporal instances of the data set.

The restore module 145 recovers a temporal instance of the data set responsive to receiving a restore command. In one embodiment, the restore command is a user command. For example, the user may issue the restore command to restore a specified temporal instance of the data set. The restore command comprises a data set identifier identifying the data set to be recovered and a target time value specifying the temporal instance of the data set.

Responsive to the restore command, the restore module 145 copies the full data set backup from the backup data storage device 130 to the target data storage device 135. In one embodiment, the target data storage device 135 is the active data storage device 125. In addition, the restore module 145 determines if the target time value is subsequent to or equal to the first differential time stamp. If the target time value is subsequent or equal to the first differential time stamp, the restore module 145 copies the data block of the first differential data set backup to the target data storage device 135 overlaying the corresponding data block of the full data set backup.

The restore module 145 overlays a data block by copying a second instance of the data block over the first instance of the data block. For example, the first differential data set backup may include a second instance of data block six (6). The restore module 145 copies the instance of data block six (6) over a first instance of data block six (6) copied to the target data storage device 135 from the full data set backup. The data backup system 100 creates differential data backups using the snapshot module 110 on-write data structure information, and restores a data set using the differential data backups. The data backup system 100 reduces the quantity of data that must be backed up for each temporal instance of a data set by using the differential data backups. For example, if a data set comprises one hundred (100) data blocks, the data backup system 100 would backup the data set by creating a full data set backup of the one hundred (100) data blocks. If subsequently one data block of the data set is modified, the data backup system 100 must only copy the one modified data block as a differential data set backup.

Figure 2:
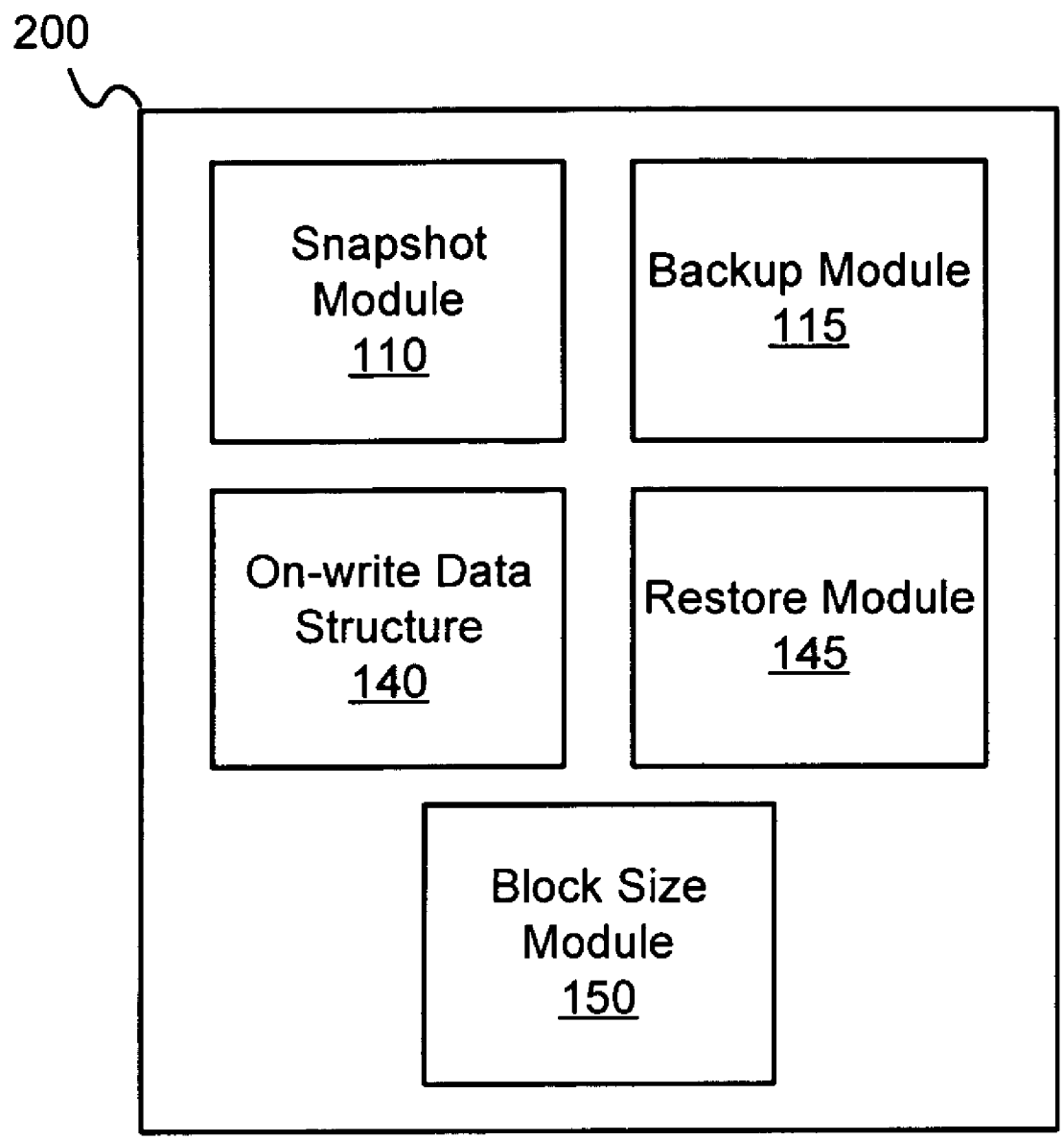
FIG. 2 is a schematic block diagram illustrating one embodiment of a data backup apparatus of the present invention.

FIG. 2 is a schematic block diagram illustrating one embodiment of a data backup apparatus 200 of the present invention. As described in FIG. 1, the snapshot module 110 tracks writes to data blocks of the active data storage device 125 in an on-write data structure 140. The backup module 115 employs the on-write data structure 140 to perform a differential backup of the data set. In addition, the restore module 145 restores a specified temporal instance of the data set.

In one embodiment, the backup module 115 creates one or more incremental differential data set backups referred to herein as incremental data set backups. The backup module 115 copies a first incremental data set backup to the backup data storage device 120 subsequent to copying the data set of the active data storage device to the backup data storage device 130 as the full data set backup. The first incremental data set backup comprises each data block of the data set indicated by the write records of the on-write data structure and a first incremental time stamp. The backup module 115 further directs the snapshot module 110 to clear the write records of the on-write data structure 140. Immediately subsequent to clearing the write records, the on-write data structure 140 has no write records of writes to the data set.

The snapshot module 110 may record additional write records in the on-write data structure subsequent to clearing the write records. The backup module 115 uses the subsequent write records to create a second incremental data set backup. Thus the backup module 115 copies a second incremental time stamp and each data block of the data set that was written to subsequent to clearing the write records of the on-write data structure 140 to the backup data storage device 130 as the second incremental data set backup.

The full data set backup, the first incremental data set backup, and the second incremental data set backup singly and in combination form a plurality of temporal instances of the data set. For example, the full data set backup comprises a first temporal instance, while the full data set backup and the first incremental data set backup comprise a second temporal instance of the data set. In addition, the full data set backup, the first incremental data set, and the second incremental data set backup together comprise a third temporal instance of the data set.

The restore module 145 may use the first and second incremental data set backups and the full data set backup to recover the plurality of temporal instances of the data set. For example, the full data set backup and the first and second incremental data set backups form three temporal instances of the data set. The restore module 145 may recover each of the temporal instances of the data set in response to the restore command. The restore module 145 copies the full data set backup to the target data storage device 135. In one embodiment, the restore module 145 copies the full data set backup to the target data storage device 135 if the time target is subsequent to or equal to the full data time stamp. In addition, the restore module 145 copies the first incremental data set backup to the target data storage device 135 overlaying the corresponding data block(s) of the full data set backup if the time target is subsequent to or equal to the first incremental time stamp. The restore module 145 further copies the second incremental data set backup to the target data storage device 135 overlaying the corresponding data block(s) of the full data set backup and the first incremental data set backup if the time target is subsequent to or equal to the second incremental time stamp.

In an alternate embodiment, the backup module 115 creates one or more cumulative differential data set backups referred to herein as cumulative data set backups. The backup module 115 copies a first cumulative data set backup to the backup data storage device 120 subsequent to copying the data set of the active data storage device to the backup data storage device 130 as the full data set backup. For example, the backup module 115 copies one or more data blocks of the data set as indicated by the write records of the on-write data structure and a first cumulative time stamp to the first incremental data set backup. However, the backup module 115 does not direct the snapshot module 110 to clear the write records of the on-write data structure subsequent to creating the first cumulative data set backup.

The snapshot module 110 may record additional write records in the on-write data structure 140, the on-write data structure 140 already containing the write records used for the first cumulative data set backup referred to herein as cumulative write records. The backup module 115 uses the cumulative write records to create a second incremental data set backup. Thus the backup module 115 copies a second cumulative time stamp and each data block of the data set that was written to subsequent the creation of the full data set backup to the backup data storage device 130 as the second cumulative data set backup.

The full data set backup, the first cumulative data set backup, and the second cumulative data set backup singly and in combination comprise a plurality of temporal instances of the data set. For example, the full data set backup comprises a first temporal instance, while the full data set backup and the first cumulative data set backup comprise a second temporal instance of the data set. In addition, the full data set backup and the second cumulative data set backup comprise a third temporal instance of the data set.

In one embodiment, the restore module 145 recovers a selected temporal instance of the data set to a target data storage device 135 in response to the restore command. In one embodiment, the restore module 145 copies the full data set backup from the backup data storage device 130 to the target data storage device 135. In addition, if the target time value of the restore command is subsequent to or equal to the first cumulative time stamp and prior to the second cumulative time stamp, the restore module 145 copies the data block(s) of the first cumulative data set backup to the target data storage device 135 overlaying the corresponding data block(s) of the full data set backup. If the target time value of the restore command is subsequent to or equal to the second cumulative time stamp, the restore module 145 copies the data block(s) of the second cumulative data set backup to the target data storage device 135 overlaying the corresponding data blocks of the full data set backup.

The data backup apparatus 200 uses the on-write data structure 140 and the snapshot module 110 to create differential data set backups of a data set. In one embodiment the differential data set backups are incremental data set backups. In an alternate embodiment, the differential data set backups are cumulative data set backups. The data backup apparatus 200 further recovers the data set with the full data set backup and the differential data set backups.

Figure 3:
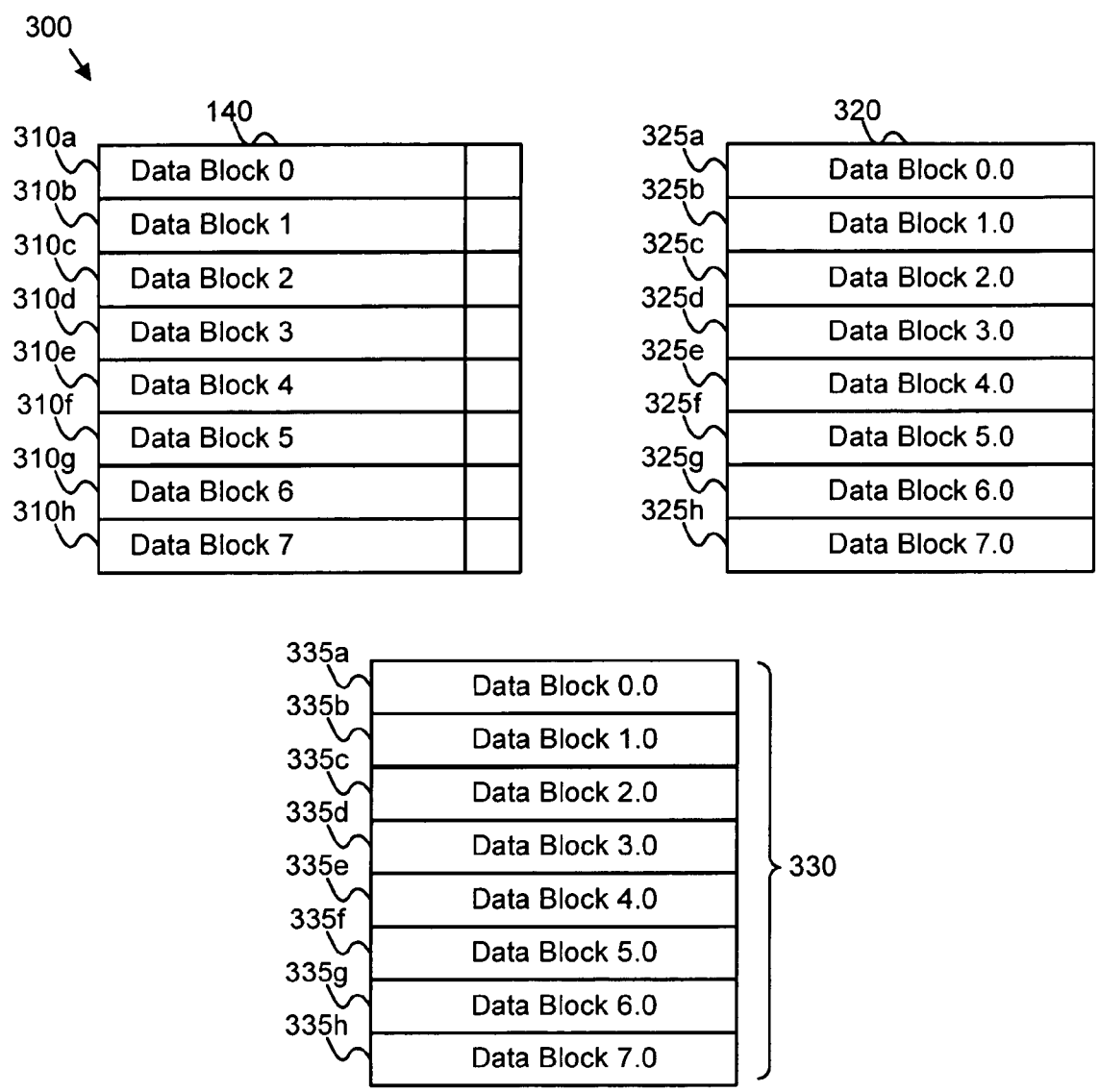
FIG. 3 is a schematic block diagram illustrating one embodiment of an initial state of the present invention.

FIG. 3 is a schematic block diagram illustrating one embodiment of an initial state 300 of the present invention. The initial state 300 depicts the on-write data structure 140, the data set 320, and a full data set backup 330. Each data block in the data set 320 and the full data set backup 330 is identified by a first number such as 1 or 4 followed by a point (.), and a second number representing the temporal instance of the data block. In one embodiment, the backup module 115 copies the data set 320 to the backup storage device 130 as the full data set backup 330. In addition, the backup module 115 directs the snapshot module 110 to clear the write records 310 of the on-write data structure 140. The on-write data structure 140 is depicted as an array of write records 310, each with a data block identifier, for each data block in the data set 320. In an alternate embodiment, the on-write data structure 140 may be a plurality of arrays, each array including one or more write records 310.

FIG. 4 is a series of schematic block diagrams illustrating one embodiment of an incremental data backup process 400 of the present invention. The incremental data backup process 400 begins with the initial state 300 as depicted in FIG. 3. As shown in FIG. 4a, data block 1 325b and data block 4 325e of the data set 320 are written to as indicated by shading. The snapshot module 110 records write record 1 310b and write record 4 310e in the on-write data structure 140. The backup module 115 creates a first incremental data set backup 405 using the write records 310 of the on-write data structure 140 by copying data block 1.1 325b and data block 4.1 325e as indicated by the write records 310b, 310e to the backup data storage device 130 as data block 1.1 410b and data block 4.1 410e as the first incremental data set back 410.

Figure 4A:
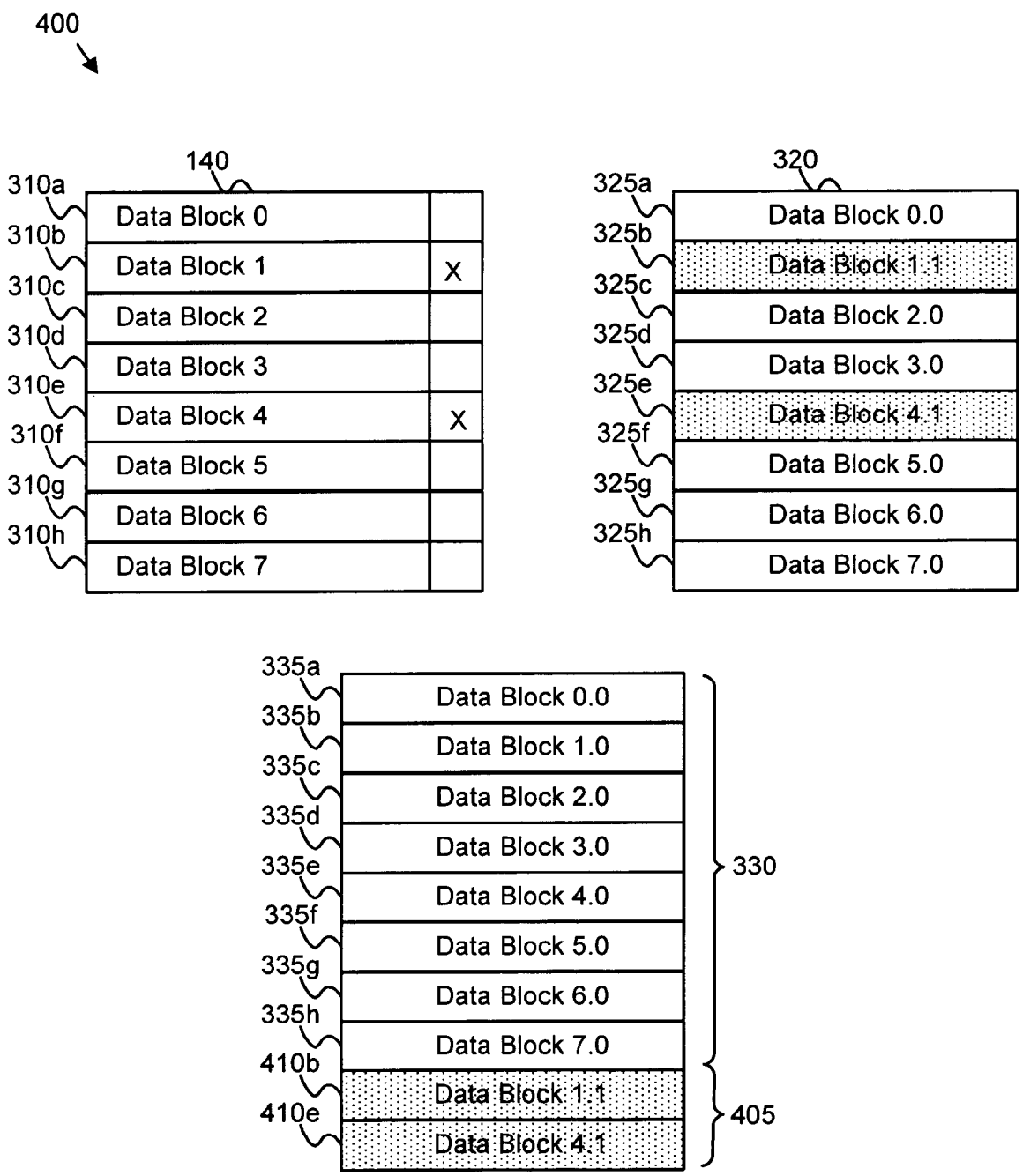
FIGS. 4a through 4f is a series of schematic block diagrams illustrating one embodiment of an incremental data backup process of the present invention.
Figure 4B:
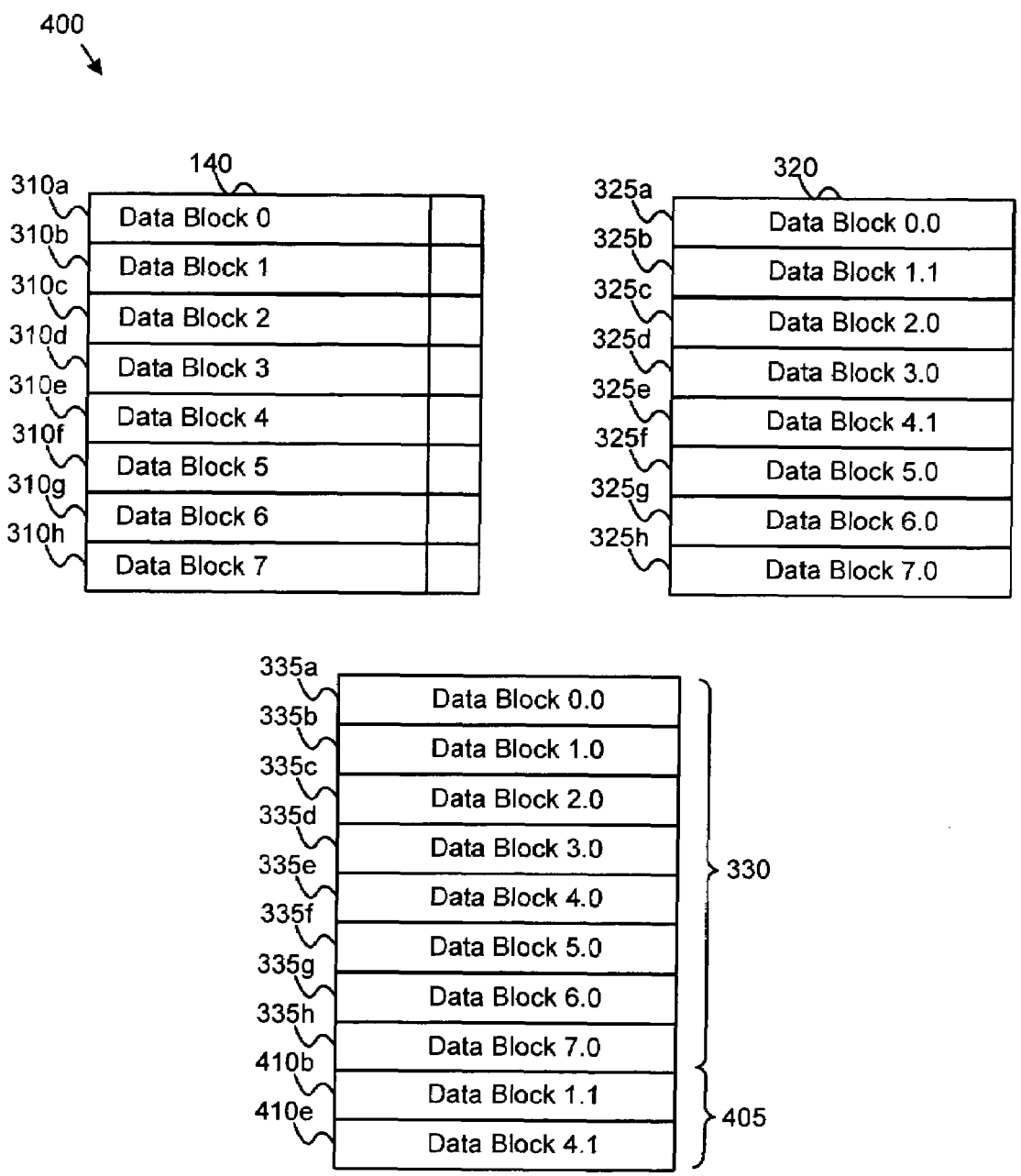
Figure 4C:
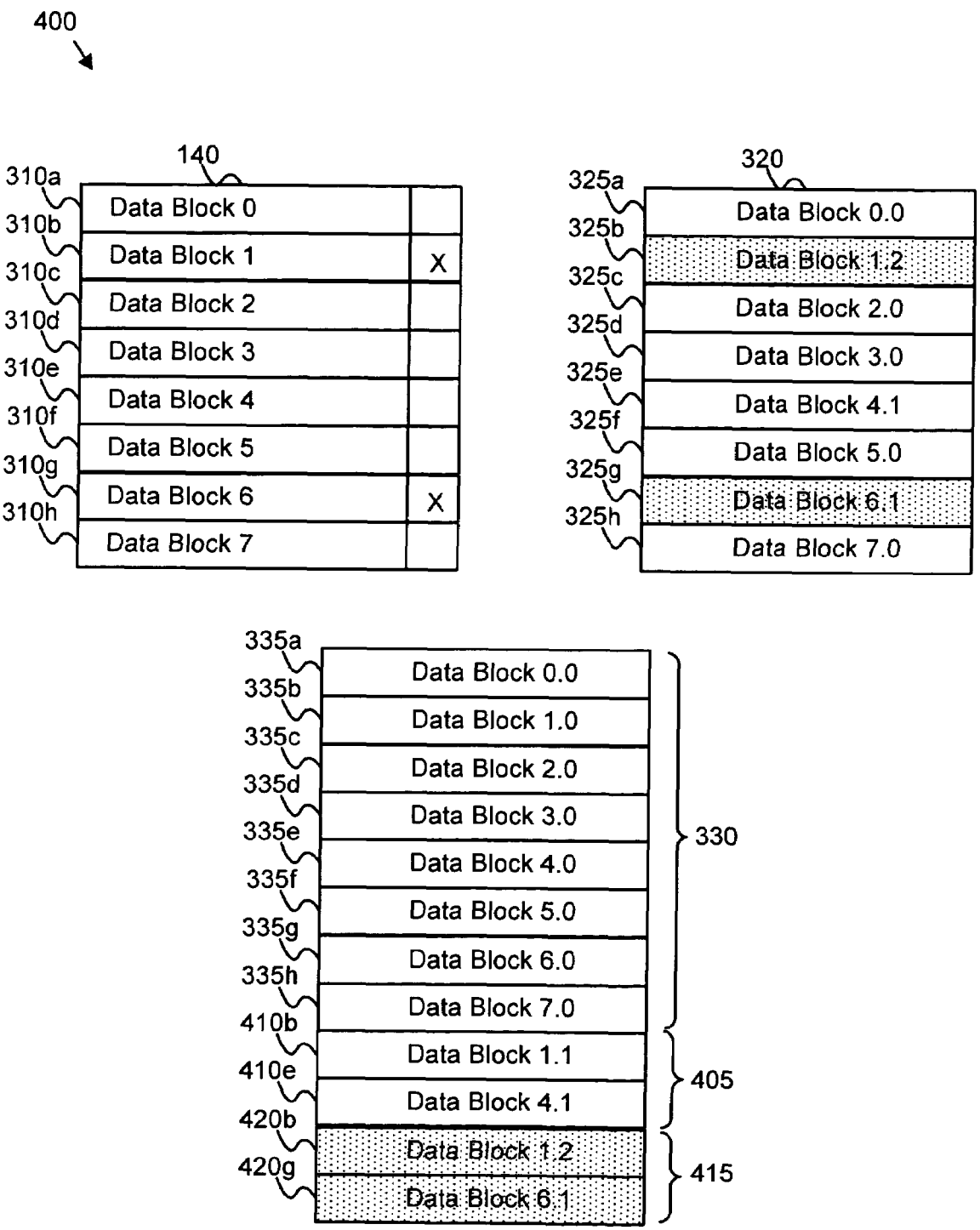

In FIG. 4b, the backup module 115 directs the snapshot module 110 to clear the write records 310 of the on-write data structure 140. The full data set backup 330 forms a first temporal instance of the data set 320 and the full data set backup 330 and the first incremental data set backup 405 form a second temporal instance of the data set 320. As shown in FIG. 4c, the data block 1 325b and data block 6 325g of the data set 320 are written to. The snapshot module 110 records write record 1 310b and write record 6 310g in the on-write data structure 140. The backup module 115 creates a second incremental data set backup 415 using the write records 310 of the on-write data structure 140 by copying data block 1.2 325b and data block 6.1 325g as indicated by the write record for data block 1 310b and data block 6 310g to the backup data storage device 130 as data block 1.2 420b and data block 6.1 420g to comprise a second incremental data set backup 420.

Figure 4D:
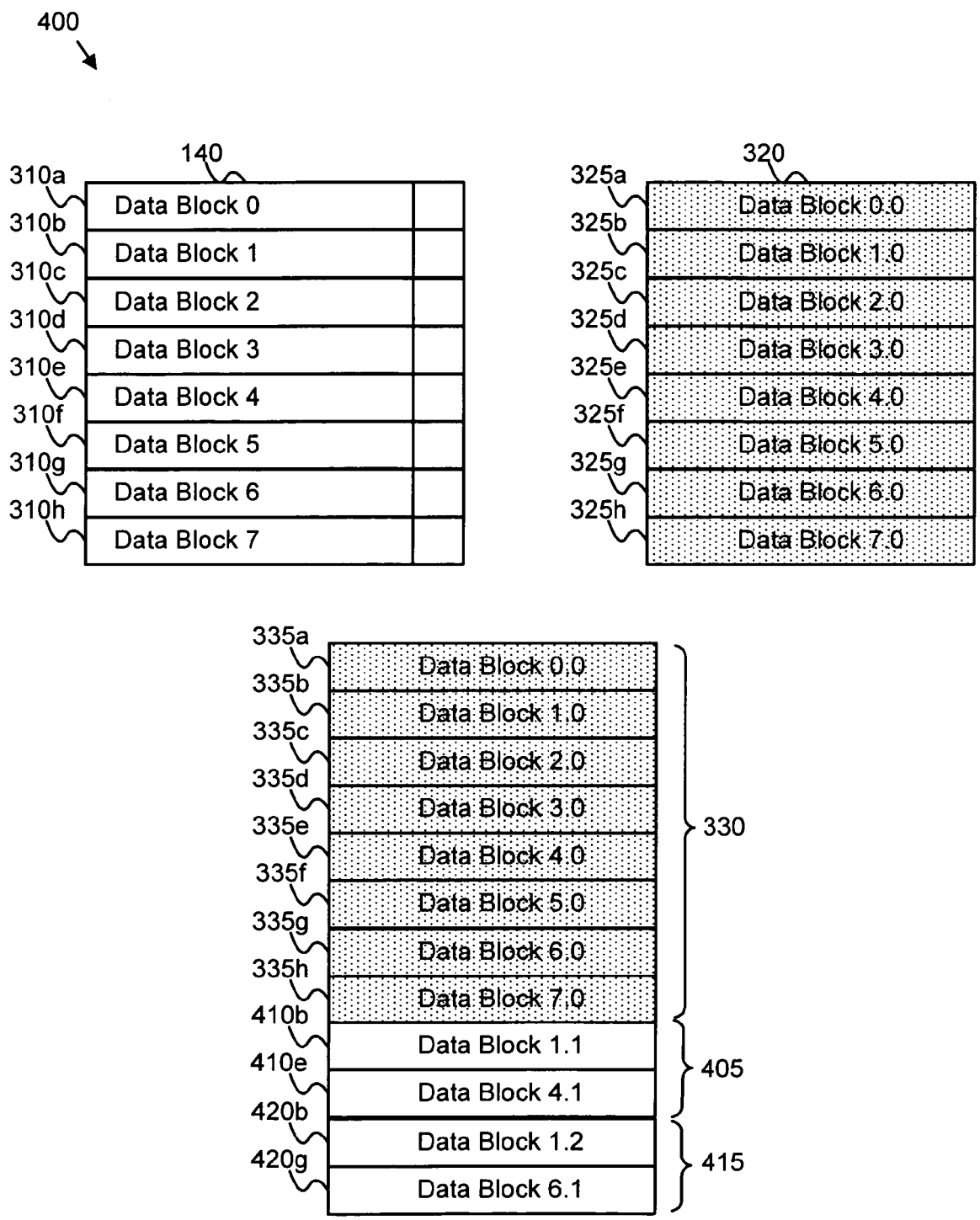
Figure 4E:
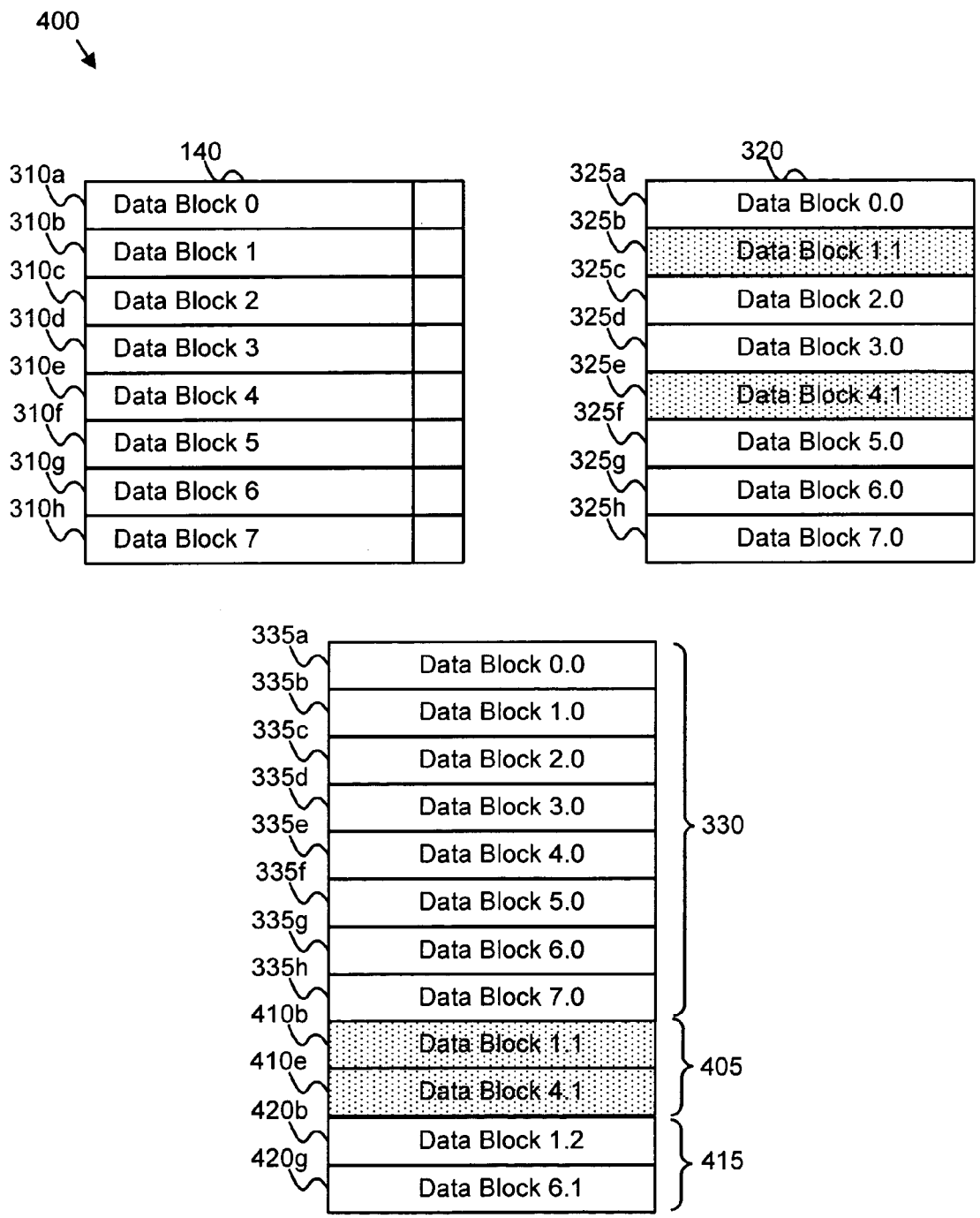

As shown in FIG. 4d, the restore module 145 copies the full data set backup 330 to a target data storage device 135 which as depicted is the active data storage device 125 in response to the restore command. As shown in FIG. 4e, the restore module 145 copies the first incremental data set backup 405 to the active data storage device 125 overlaying the data blocks of the full data set backup 330. The first incremental data set backup 405 is copied if the target time value of the restore command is subsequent to or equal to the first incremental time stamp. Thus data block 1.1 410b is copied over data block 1 335b and data block 4.1 410g is copied over data block 4 335e.

Figure 4F:
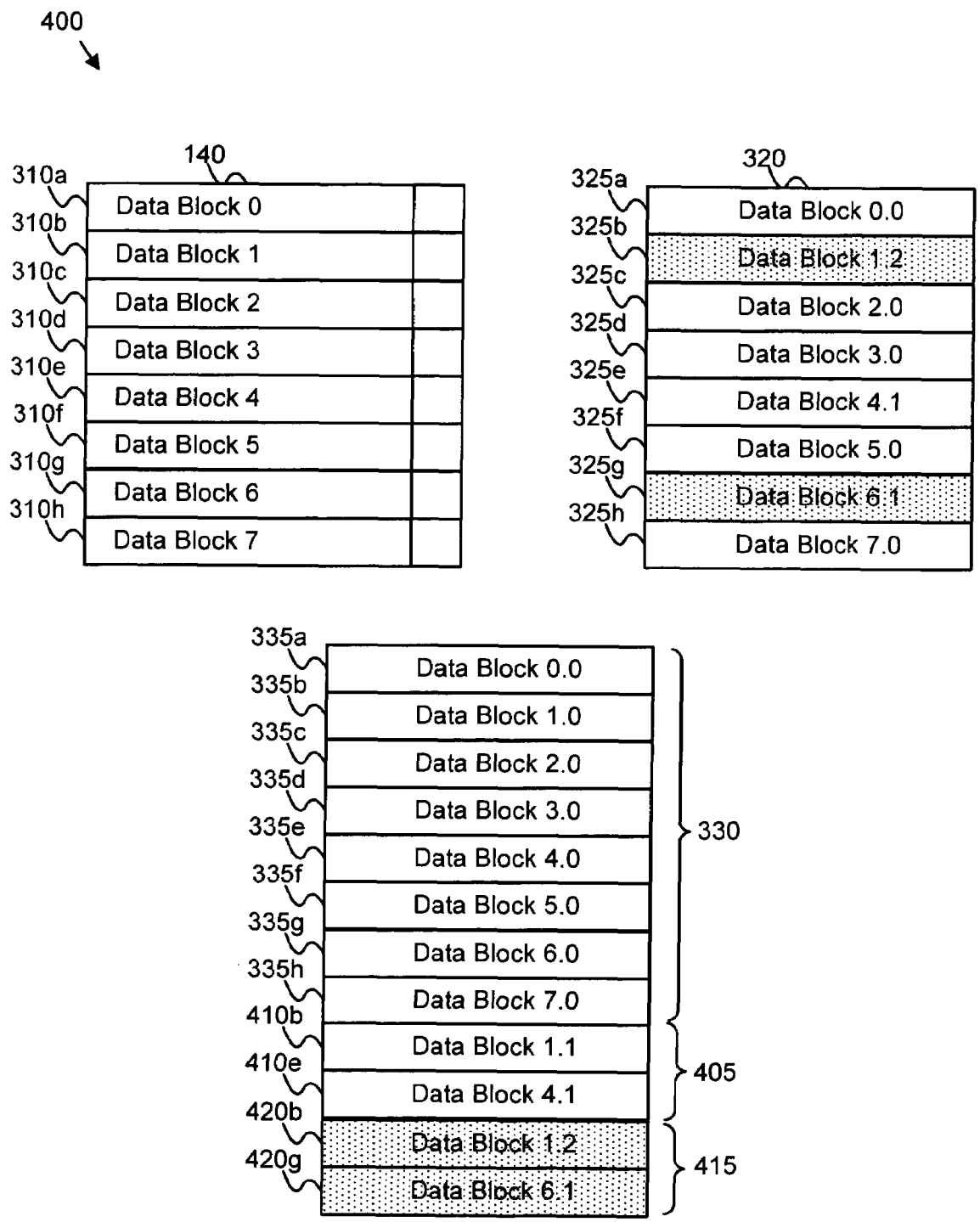

As shown in FIG. 4f, the restore module 145 copies the second incremental data set backup 415 to the active data storage device 125 overlaying the data blocks of the full data set backup 330 and the first incremental data set backup 410. The second incremental data set backup 415 is copied if the time target of the restore command is subsequent to or equal to the second incremental time stamp. Thus data block 1.2 420b is copied over data block 1 335b and data block 6.1 420g is copied over data block 6 335g.

FIG. 5 is a series of schematic block diagrams illustrating one embodiment of a cumulative data backup process 500 of the present invention. The cumulative data backup process 500 begins with the initial state 300 as depicted in FIG. 3. As shown in FIG. 5a, data block 1 325b and data block 4 325e of the data set 320 are written to. The snapshot module 110 records write record 1 310b and write record 4 310e in the on-write data structure 140. The backup module 115 creates a first cumulative data set backup 505 using the write records 310 of the on-write data structure 140 by copying data block 1.1 325b and data block 4.1 325e indicated by the write record 1 310b and write record 4 310e to the backup data storage device 130 as data block 1.1 510b and data block 4.1 510e.

Figure 5A:
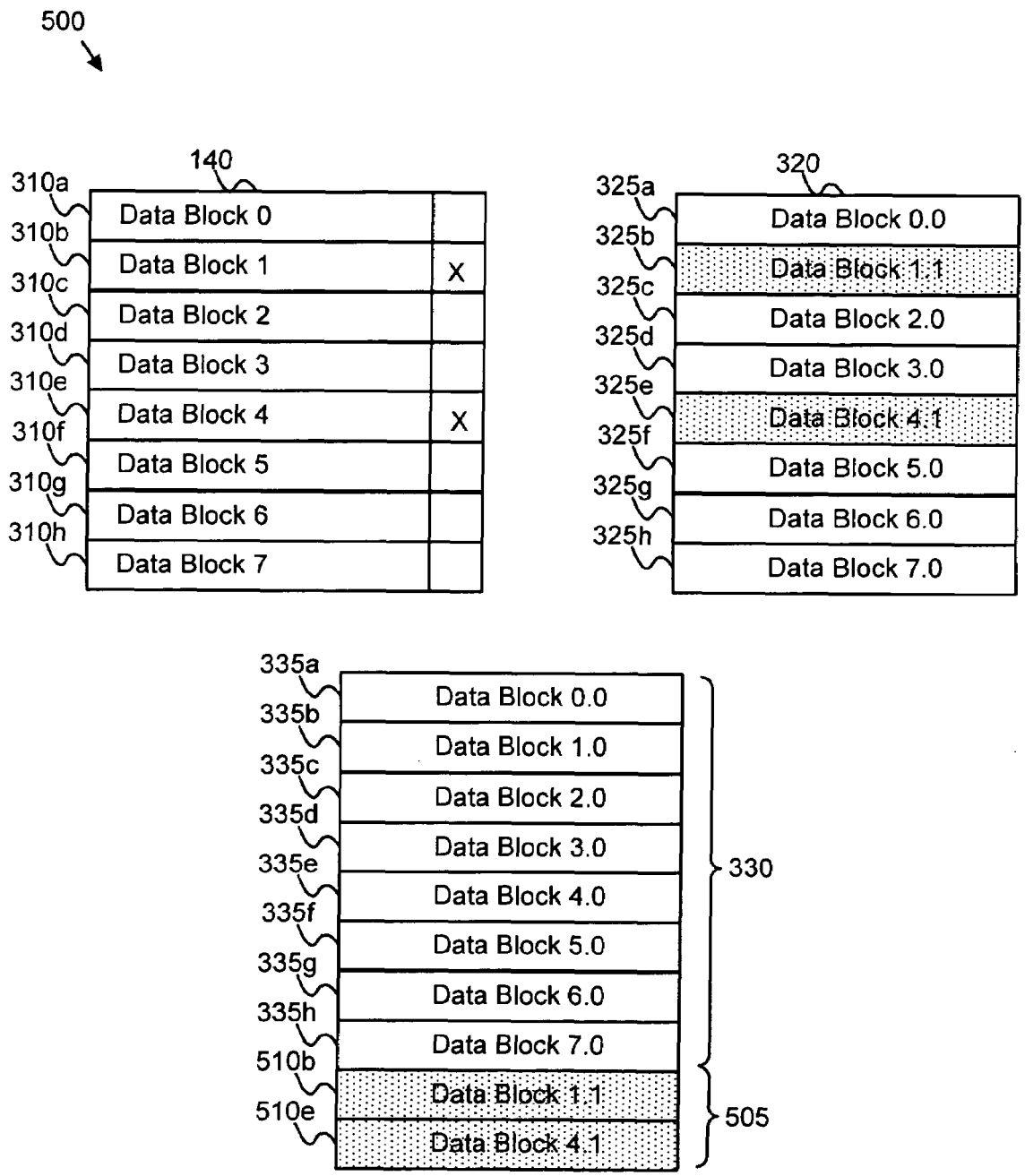
FIGS. 5a through 5d is a series of schematic block diagrams illustrating one embodiment of a cumulative data backup process of the present invention.
Figure 5B:
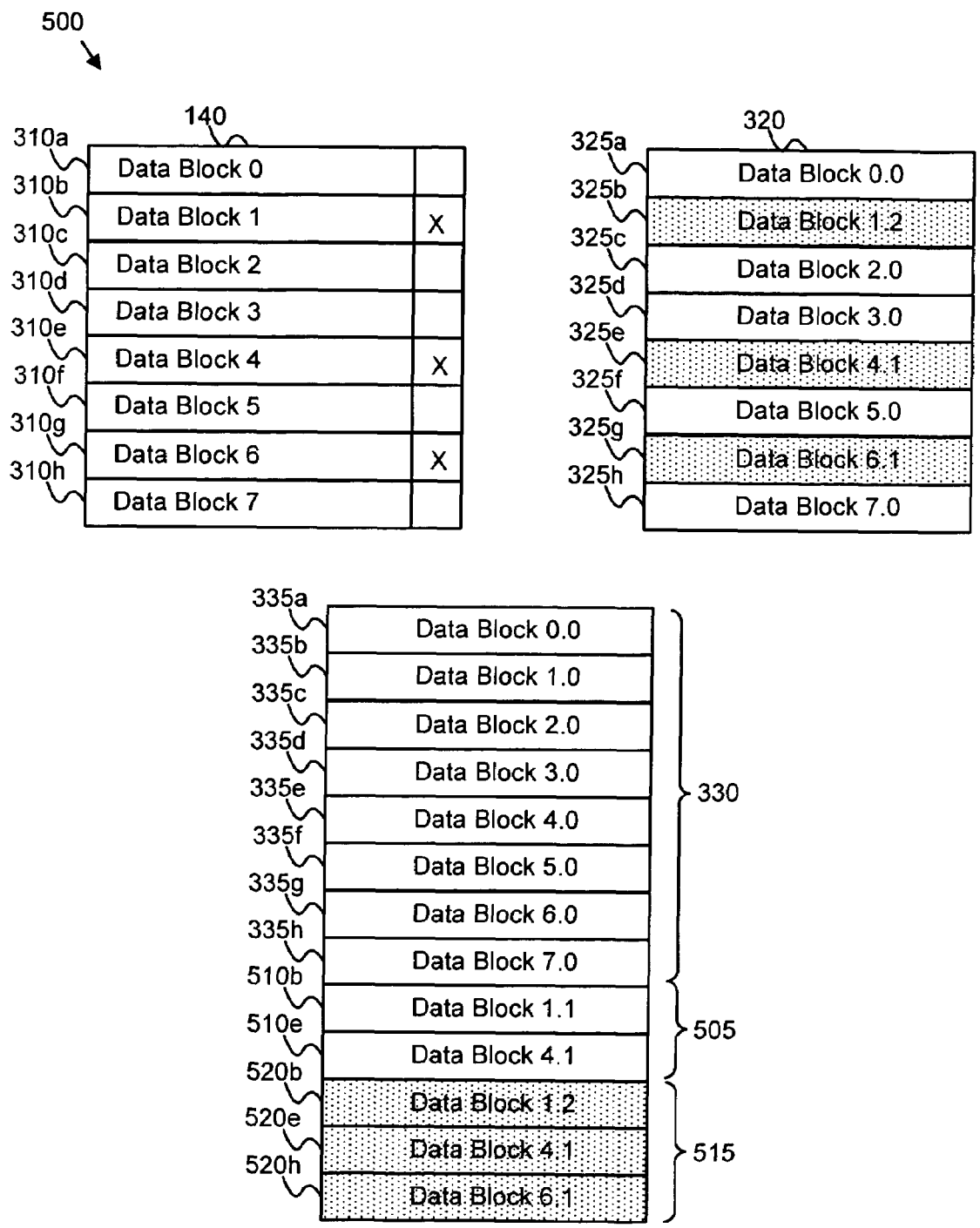

As shown in FIG. 5b, the full data set backup 330 comprises a first temporal instance of the data set 320 and the full data set backup 330 and the first cumulative data set backup 505 comprise a second temporal instance of the data set 320. Data block 1 325b and data block 6 325g of the data set 320 are written to. The snapshot module 110 records write record 1 310b and write record 6 310g in the on-write data structure 140. The backup module 115 creates a second incremental data set backup 515 by copying data block 1.2 325b, data block 4.1 325e, and data block 6.1 325g to the backup data storage device 130 as data block 1.2 520b and data block 6.1 520g as indicated by write record 1 310b, write record 4 310e, and write record 6 310g of the on-write data structure 140.

Figure 5C:
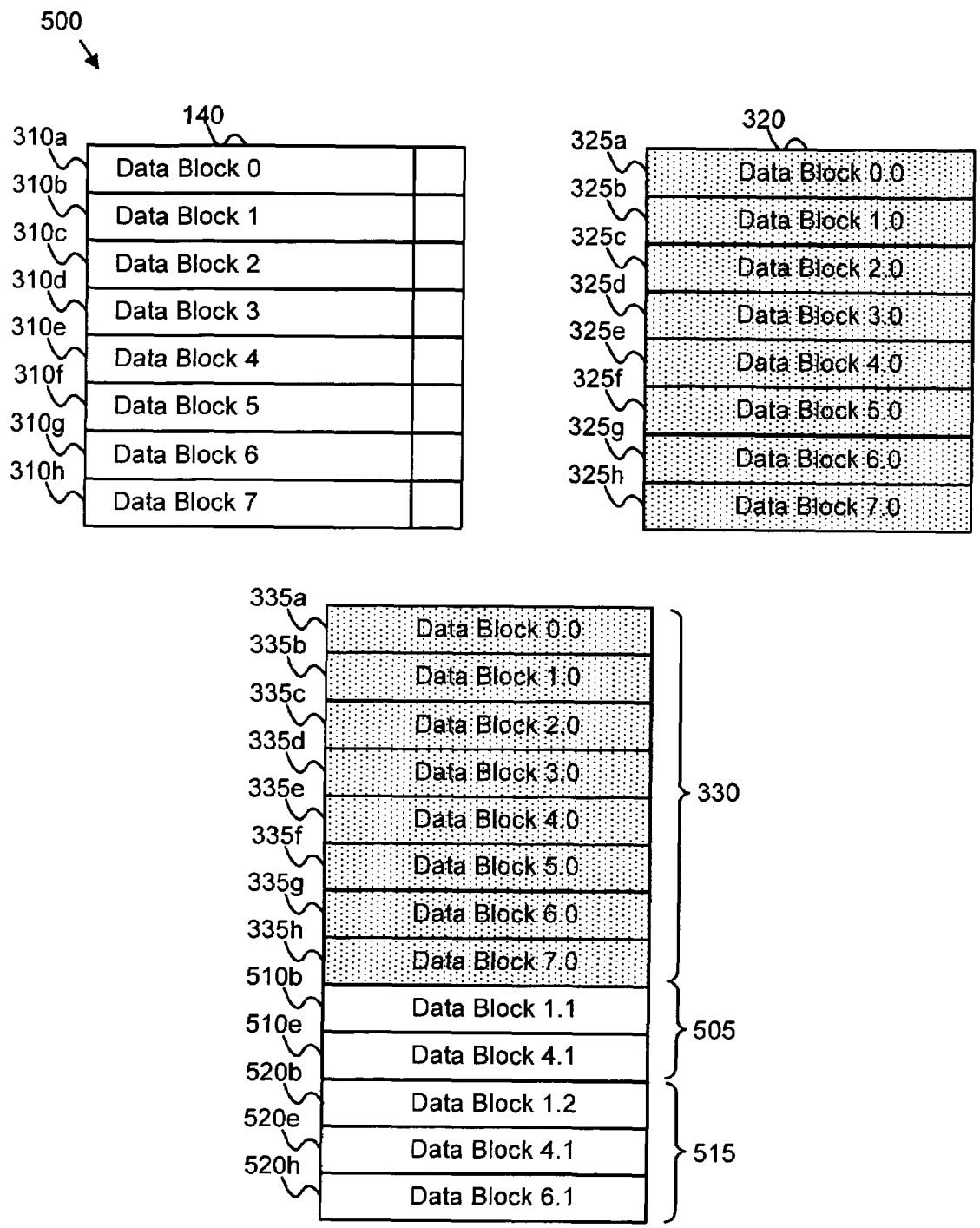
Figure 5D:
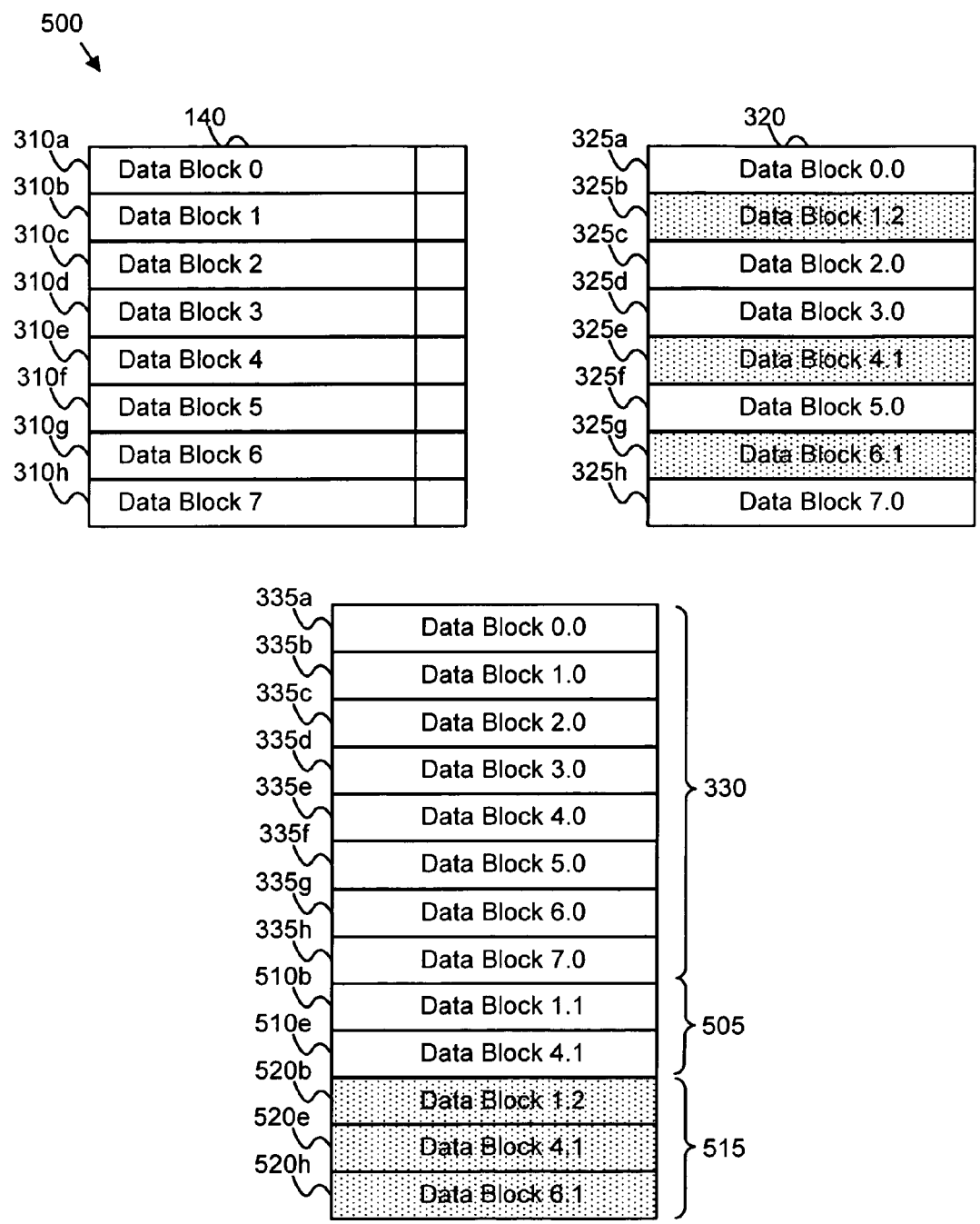

As shown in FIG. 5c, the restore module 145 copies the full data set backup 330 to a target data storage device 135 which as depicted is the active data storage device 125 in response to the restore command. In FIG. 5d, the restore module 145 copies the second cumulative data set backup 515 to the active data storage device 125 overlaying the data blocks of the full data set backup 330. The second cumulative data set backup 515 is copied the second cumulative time stamp corresponds to the target time value. Thus data block 1.2 520b is copied over data block 1 335b, data block 4.1 510g is copied over data block 4 335e, and data block 6.1 520g is copied over data block 6 335g.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
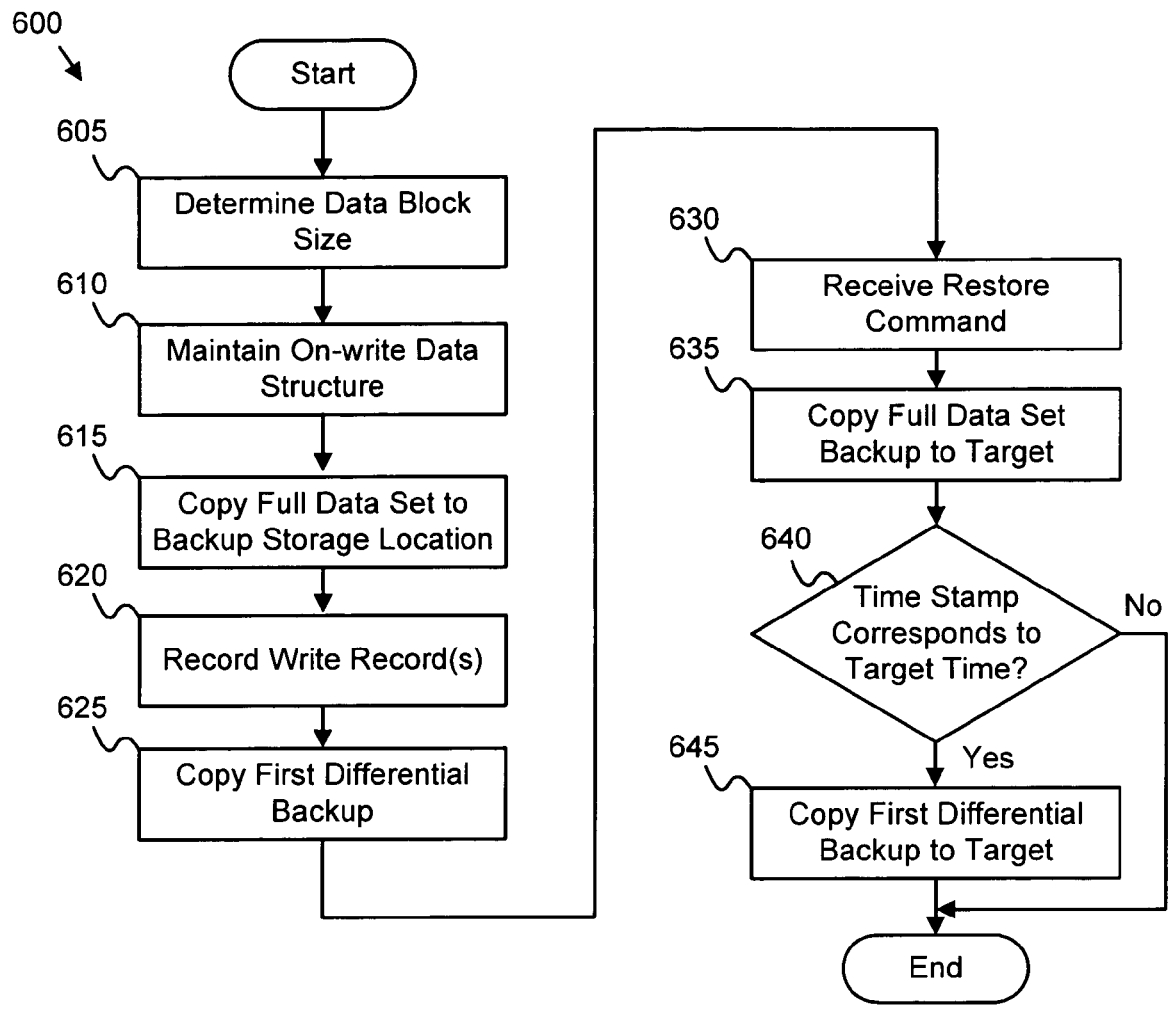
FIG. 6 is a schematic flow chart diagram illustrating one embodiment of a data backup method in accordance with the present invention.

FIG. 6 is a schematic flow chart diagram illustrating one embodiment of a data backup method 600 in accordance with the present invention. The block size module 150 determines 605 a data block size for a write record 310 of an on-write data structure 140 for the data of the active data storage device 125. In one embodiment, the data block size is the data block size of the active data storage device 125. In an alternate embodiment, the data block size is determined from a log of active data storage device 125 writes such that the data block size is a specified percentage of the size of the average write to the active data storage device 125. For example, if the size of the average write to the active data storage device 125 is four kilobytes (4 KB), the block size module 150 may determine 605 the data block size to be one hundred fifty per cent (150%) of the size of the average write or six kilobytes (6 KB).

The snapshot module 110 maintains 610 the on-write data structure 140 comprising at least one write record 310 for each write to each data block 325 of the active data storage device 125. Each write record 310 includes a data block identifier. In one embodiment, the snapshot module 110 also records write records 310 for functions unrelated data backup. The backup module 115 copies 615 the data set to a backup data storage device 130 as a full data set backup 330. The data set 320 remains accessible on the active data storage device 125 while copied.

The backup module 115 further records 620 a write record 310 for a write to a data block 325 of the data set 320 in the on-write data structure 140. The backup module 115 copies 625 each data block 325 indicated by the data block identifier of each recorded write record 310 to a backup data storage device 130 as a first differential data set backup. In one embodiment, the first differential data set backup is configured as a first incremental data set backup 410. The backup module 15 includes a first incremental time stamp in the first incremental data set backup 410. In an alternate embodiment, the first differential data set backup is configured as a first cumulative data set backup 510, and the backup module 115 includes a first cumulative time stamp in the first cumulative data set backup 510. The first cumulative time stamp and the first incremental time stamp are each first differential time stamps.

In one embodiment, the restore module 145 restores the data set to a target data storage device upon receiving 630 a restore command. The restore command includes a data set identifier identifying the data set 320 to be restored and a target time value. The target time value indicates the temporal instance of the data set 320 to be recovered. The restore module 145 copies 635 the full data set backup 330 to a target data storage device 135.

In addition, the restore module 145 may determine 640 if the target time value corresponds to the first differential time stamp. The target time value may correspond to the first differential time stamp if the target time value is subsequent to or equal to the first differential time stamp. If the target time value corresponds to the first differential time stamp, the restore module 145 copies 645 each data block of the first differential data set backup to the target data storage device 135 overlaying the corresponding data block(s) of the full data set backup 330 and the method 600 ends. If the target time value does not correspond to the first differential time stamp, the method ends 600. The data backup method 600 creates backups of a plurality of temporal instances of a data set using differential data set backups and restores one or more temporal instances of the data set from the differential data set backups. The differential data set backups may be cumulative data set backups and incremental data set backups.

Figure 7:
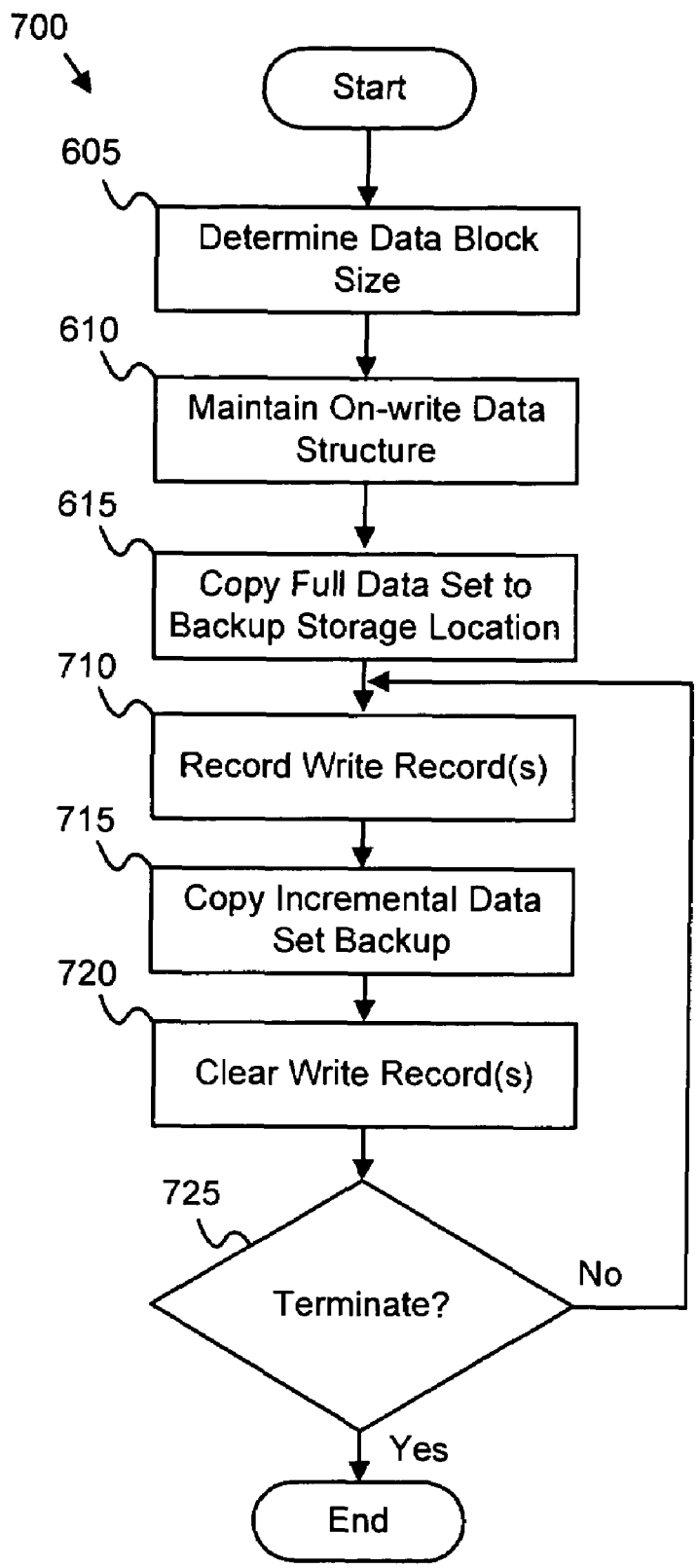
FIG. 7 is a flow chart illustrating one embodiment of an incremental backup method of the present invention.

FIG. 7 is a flow chart illustrating one embodiment of an incremental backup method 700 of the present invention. The method 700 is in certain embodiments a method of use of the system and apparatus of FIGS. 1-2, and will be discussed with reference to those figures. Nevertheless, the method 700 may also be conducted independently thereof and is not intended to be limited specifically to the specific embodiments discussed above with respect to those figures.

As shown in FIG. 7, the block size module 150 determines 605 the block size of the write record 310, the snapshot module 110 maintains 610 the on-write data structure 140, and the backup module 115 copies 615 the data set to a backup data storage device 130 as described in FIG. 6. The snapshot module 110 records 710 the write record 310 for each write to the data set 320. The backup module 115 copies 715 the data blocks 325 of the data set 320 and an incremental time stamp as an incremental data set backup 410 to the backup data storage device 130.

The backup module 115 directs the snapshot module 110 to clear 720 the write records 310 of the on-write data structure 140. In addition, the backup module 115 determines 725 whether to terminate data backup. The backup module 115 may terminate in response to a user command. If the backup module 115 does not terminate, the backup module 115 copies 715 data blocks 325 of the data set 320 modified subsequently to clearing 720 the write records 310 and an incremental time stamp as a subsequent incremental data set backup 410 to the backup data storage device 130. If the backup module 115 terminates, the method 700 ends.

Figure 8:
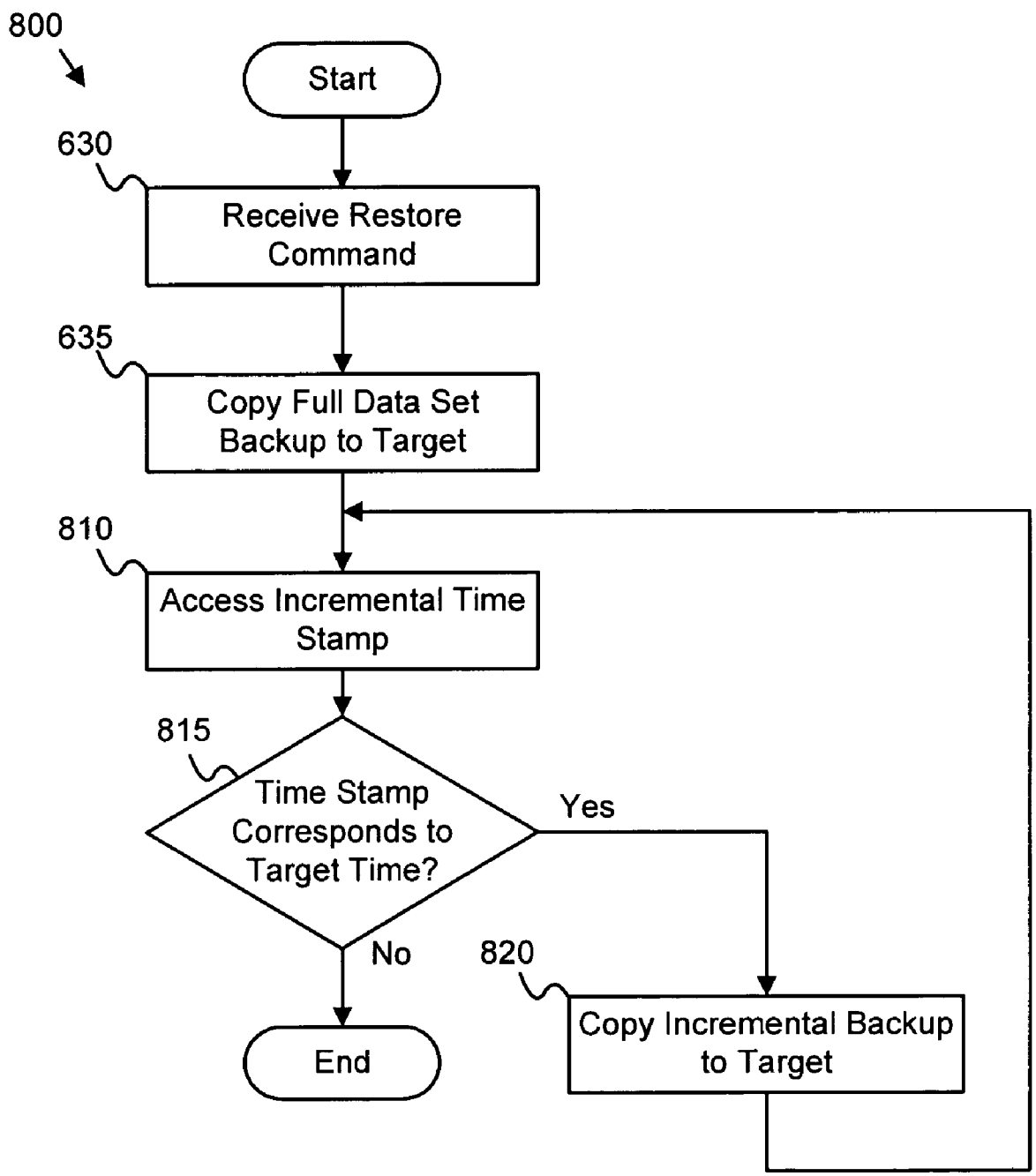
FIG. 8 is a flow chart illustrating one embodiment of an incremental restore method of the present invention.

FIG. 8 is a flow chart illustrating one embodiment of an incremental restore method 800 of the present invention. The method 800 is in certain embodiments a method of use of the system and apparatus of FIGS. 1-2, and will be discussed with reference to those figures. Nevertheless, the method 800 may also be conducted independently thereof and is not intended to be limited specifically to the specific embodiments discussed above with respect to those figures.

As shown in FIG. 8, the restore module 145 receives 630 a restore command and copies 635 the full data set backup 330 of the data set identifier to a target data storage device 135 as described in FIG. 6. The restore module 145 accesses 810 the incremental time stamp of an incremental data set backup beginning with the first incremental data set backup 410. If target time value of the restore command corresponds to the first incremental time stamp, the restore module 145 copies 820 data blocks of the first incremental data set backup 140 to the target data storage device 135 overlaying the corresponding data blocks of the target data storage device 135 and the restore module 415 access 810 the incremental time stamp of the next incremental data set backup. If the target time value does not correspond to the first incremental time stamp, the restore module 145 ends the method 800. In one embodiment, the incremental time stamp corresponds to the target time value if the target time value is subsequent to or equal to the incremental time stamp.

Figure 9:
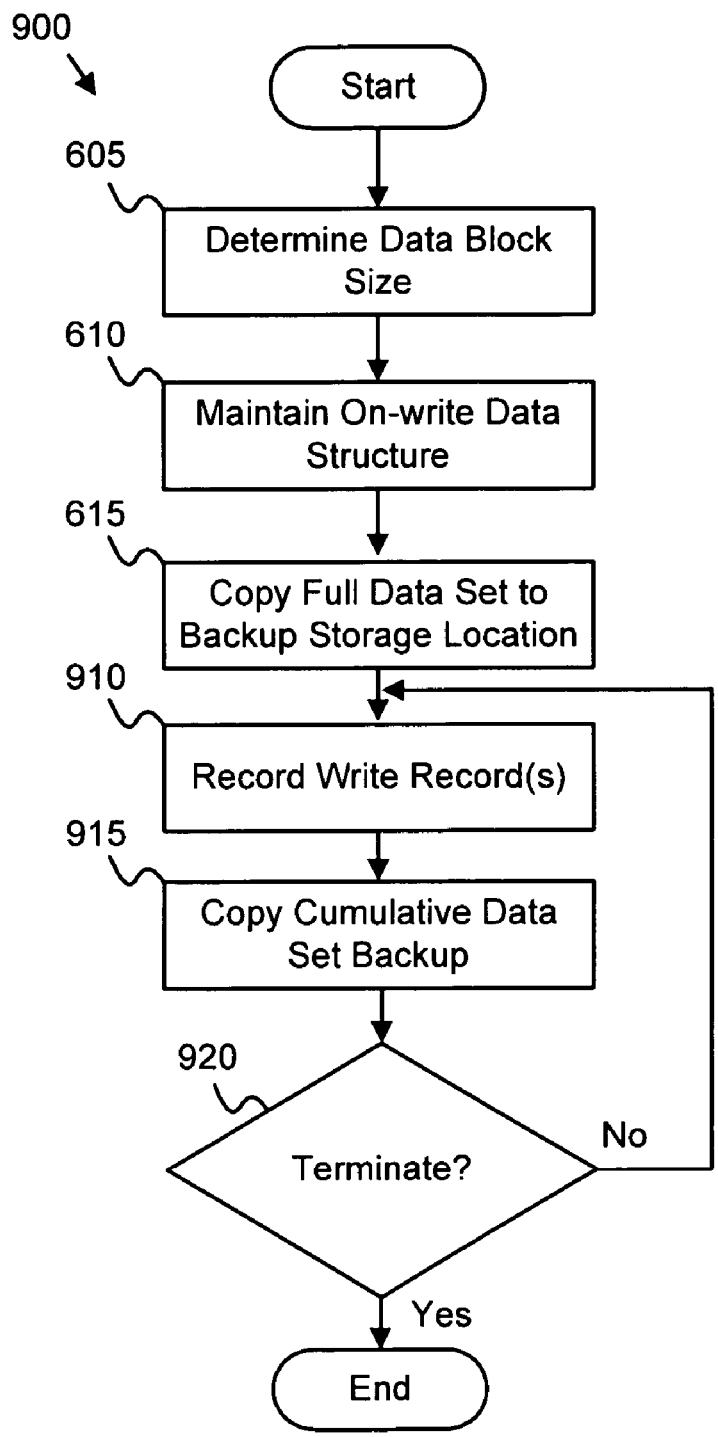
FIG. 9 is a flow chart illustrating one embodiment of a cumulative backup method of the present invention.

FIG. 9 is a flow chart illustrating one embodiment of a cumulative backup method 900 of the present invention. The method 900 is in certain embodiments a method of use of the system and apparatus of FIGS. 1-2, and will be discussed with reference to those figures. Nevertheless, the method 900 may also be conducted independently thereof and is not intended to be limited specifically to the specific embodiments discussed above with respect to those figures.

As shown in FIG. 9, the block size module 150 determines 605 the block size of the write record 310, the snapshot module 110 maintains 610 the on-write data structure 140, and the backup module 115 copies 615 the data set to a backup data storage device 130 as described in FIG. 6. The snapshot module 110 records 910 the write record 310 for each write to the data set 320. The backup module 115 copies 915 the data blocks 325 of the data set 320 and a cumulative time stamp as a cumulative data set backup 510 to the backup data storage device 130.

The backup module 115 determines 920 whether to terminate data backup. The backup module 115 may terminate in response to a user command. If the backup module 115 does not terminate, the backup module 115 copies 915 the modified data blocks 325 of the data set 320 and another cumulative time stamp as another cumulative data set backup 510 to the backup data storage device 130. If the backup module terminates, the method 700 ends.

Figure 10:
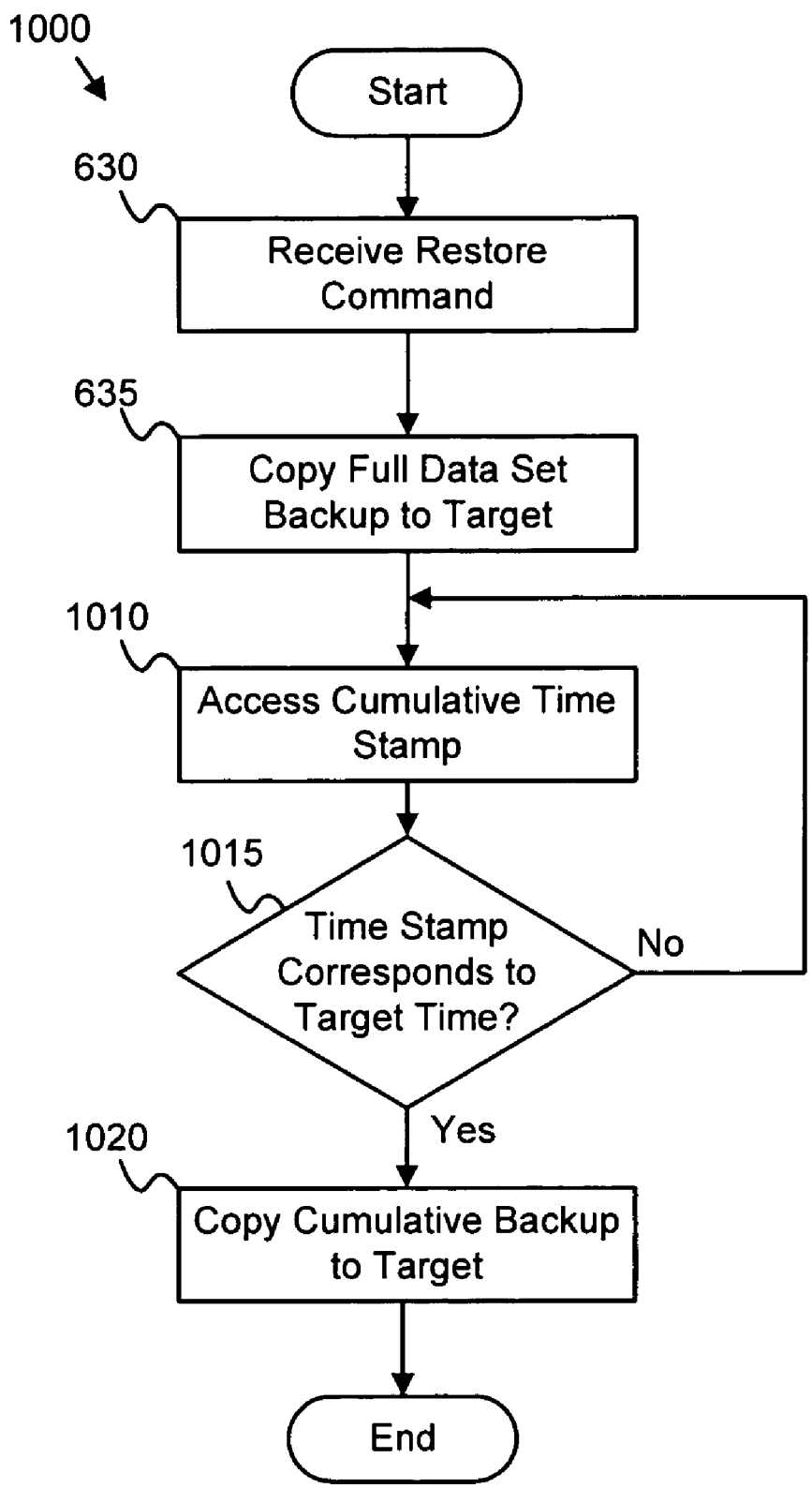
FIG. 10 is a flow chart illustrating one embodiment of a cumulative restore method of the present invention.

FIG. 10 is a flow chart illustrating one embodiment of a cumulative restore method 1000 of the present invention. The method 1000 is in certain embodiments a method of use of the system and apparatus of FIGS. 1-2, and will be discussed with reference to those figures. Nevertheless, the method 1000 may also be conducted independently thereof and is not intended to be limited specifically to the specific embodiments discussed above with respect to those figures.

As shown in FIG. 10, the restore module 145 receives 630 are store command and copies 635 the full data set backup 330 of the data set identifier to a target data storage device 135 as described in FIG. 6. The restore module 145 accesses 1010 the cumulative time stamp of a cumulative data set backup beginning with the first cumulative data set backup 510. The restore module 145 determines 1015 if the cumulative time stamp corresponds to the target time value of the restore command. If the cumulative time stamp corresponds to the target time, the restore module 145 copies 1020 each data block of the a cumulative data set backup 510 to the target data storage device 135.

In one embodiment, the target time value corresponds to the cumulative time stamp if the target time value is subsequent to or equal to the cumulative time stamp and if the target time value is prior to the cumulative time stamp of the next cumulative data set backup 520. The restore module 145 ends the method 1000 subsequent to copying 1020 the cumulative data set backup 510 to the target data storage device 135. If the cumulative time stamp does not correspond to the target time, the restore module 145 access 1010 the cumulative time stamp of the next cumulative data set backup such as the second cumulative data set backup 520 until the cumulative time stamp corresponding to the target time value is found.

Figure 11:
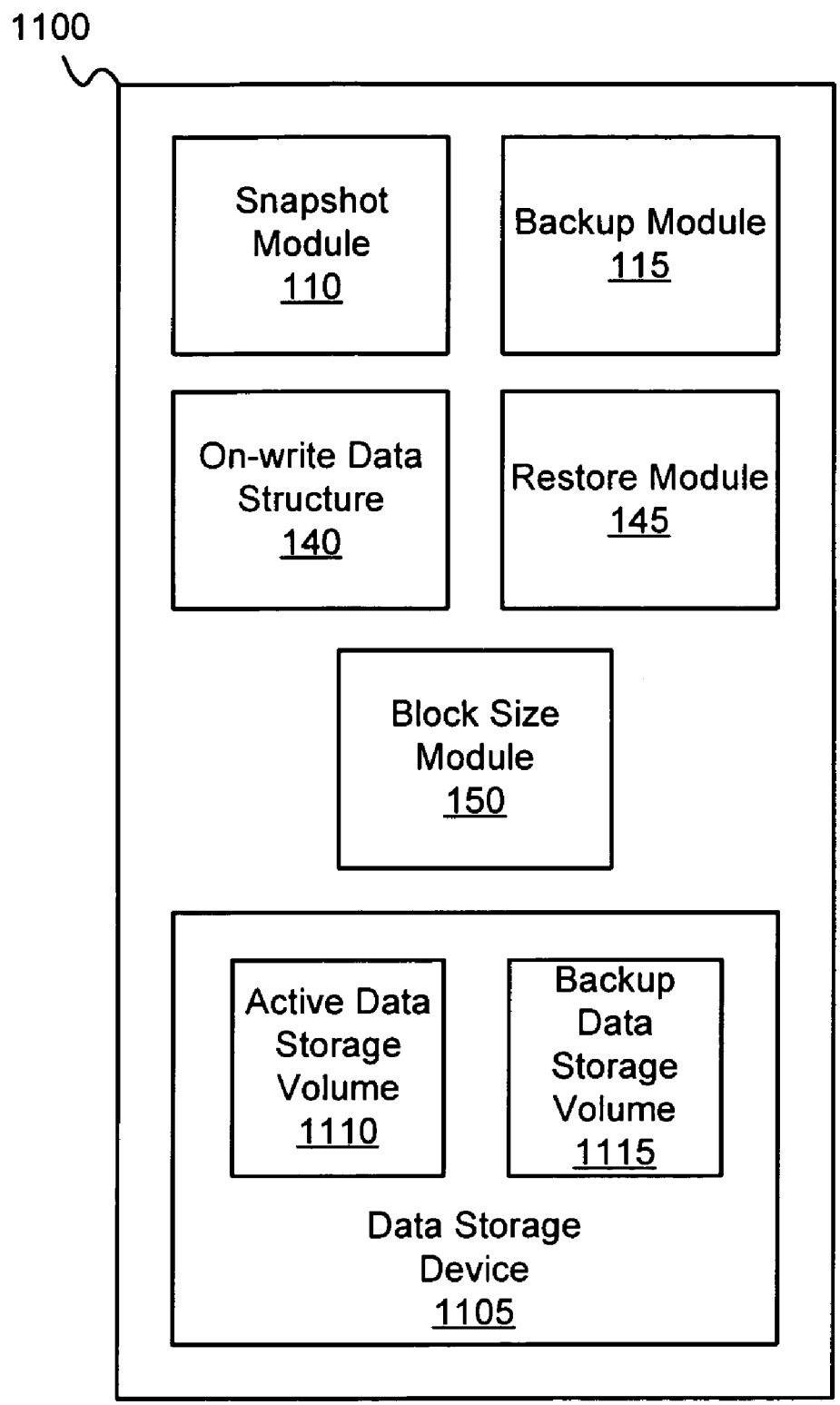
FIG. 11 is a schematic block diagram illustrating one embodiment of a data backup device of the present invention.

FIG. 11 is a schematic block diagram illustrating one embodiment of a data backup device 1100 of the present invention. The data backup device 1100 includes a data storage device 1105. The data storage device 1105 comprises a plurality of data storage volumes including an active data storage volume 1110 and a backup data storage volume 1115. The snapshot module 110 maintains the on-write data structure 140 tracking writes to a data set 320 on the active data storage volume 1110 of the data storage device 1105. The backup module 115 copies the data set to the backup data storage volume 1115 as a full data set backup 330 and copies the data blocks 325 of the data set 320 indicated by the write records 310 of the on-write data structure 140 and a first differential time stamp to the backup data storage volume 1115 as a first differential data set backup.

The restore module 145 may restore one or more temporal instances of the data set 320 to the active data storage volume 1110 in response to a restore command by coping the full data set backup 330 to the active data storage volume 1110. In addition, the restore module 145 may copy the first differential data set backup to the active data storage volume 1110 if the target time value of the restore command is subsequent to or equal to the first differential time stamp. The data backup device 1100 backups and restores data sets 320 of the data storage device 1105 using the write records 310 recorded by the snapshot module 110 in the on-write data structure 140 and by preserving information for the on-write data structure 140 in each differential data set backup.

The present invention employs the on-write data structure 140 of a snapshot module 110 to create a differential data set backup of a data set 320. The present invention further preserves on-write information in the differential data set backup and reduces the data that is stored for backing up multiple temporal instances of the data set 320. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to back up data, the apparatus comprising:
a snapshot module comprising executable code stored on a storage device, executed by a processor, and configured create an on-write data structure configured to receive a write record for a write to a data block in a data set of an active data storage device, the write record comprising a data block identifier, and to record the write record for the write to the data block of the data set in the on-write data structure;
a backup module comprising executable code stored on the storage device, executed by the processor, and configured to copy the data set to a backup data storage device configured to retrieve and store a plurality of data blocks as a full data set backup and copy a first differential time stamp and the data block indicated by the data block identifier of the recorded write record to the backup data storage device as a first differential data set backup, wherein the data set remains accessible while copied, and direct the snapshot module to clear the write record of the on-write data structure subsequent to copying the first differential data set backup to the backup data storage device and wherein the first differential data set backup is configured as a first incremental data set backup and the first differential time stamp is configured as a first incremental time stamp, and the backup module is further configured to copy a second incremental time stamp and the data block indicated by the identifier of a write record recorded subsequent to the first incremental data set backup to the backup data storage device as a second incremental data set backup; and
a restore module comprising executable code stored on the storage device, executed by the processor, and configured to recover the data set responsive to receiving a restore command comprising a data set identifier and a target time value, wherein if the data set identifier indicates the data set, the restore module is configured to copy the full data set backup to a target data storage device and if the target time value is subsequent to or equivalent to the first differential time stamp to copy each data block of the first differential data set backup to the target data storage device overlaying the corresponding data block of the full data set backup.

2. The apparatus of claim 1, further comprising a block size module comprising executable code stored on the storage device, executed by the processor, and configured to determine a data block size for the write record of the on-write data structure.

3. The apparatus of claim 2, wherein the block size module is configured to specify the data block size for the write record as the data block size of the active data storage device.

4. The apparatus of claim 1, wherein the restore module is configured to copy the full data set backup to the target data storage device, copy the data block of the first incremental data set backup to the target data storage device overlaying the corresponding data block of the full data set backup if the target time value is subsequent to or equivalent to the first incremental time stamp, and copy the data block of the second incremental data set backup to the target data storage device overlaying the corresponding data block of the full data set backup if the target time value is subsequent to or equivalent to the second incremental data time stamp.

5. The apparatus of claim 1, wherein the first differential data set backup is configured as a first cumulative data set backup, the first differential time stamp is configured as a first cumulative time stamp, and wherein the backup module is configured to copy a second cumulative time stamp and the data block indicated by the a write record recorded by the snapshot module subsequent to the full data set backup to the backup data storage device as a second cumulative data set backup, wherein the snapshot module maintains at least one cumulative write record in the on-write data structure.

6. The apparatus of claim 5, wherein the restore module is configured to copy the full data set backup to the target data storage device, select the cumulative data set backup with the cumulative time stamp corresponding to the target time value such that the target time value is subsequent to or equal to the cumulative time stamp and the target time value is prior to the cumulative time stamp of each subsequent cumulative data set backup, and copy the data block of the selected cumulative data set backup to the target data storage device overlaying the corresponding data block of the full data set backup.

7. The apparatus of claim 1, wherein the backup module is configured to periodically copy a differential time stamp and the data block indicated by the recorded write record of the on-write data structure to the backup data storage device as a plurality of differential data set backups configured as a plurality of temporal instances of the data set.

8. A device for backing up data, comprising:
   a data storage device comprising an active data storage volume comprising a data set and a backup data storage volume;
   a snapshot module comprising executable code stored on a storage device, executed by a processor, and configured to create an on-write data structure configured to receive a write record for a write to a data block in the data set, the write record comprising a data block identifier, and record the write record for the write to the data block of the data set in the on-write data structure;
   a backup module comprising executable code stored on the storage device, executed by the processor, and configured to copy the data set to the backup data storage device and copy a first differential time stamp and the data block indicated by the data block identifier of the recorded write record to the backup data storage device as a first differential data set backup wherein the data set remains accessible on the active data storage device during each copy, and direct the snapshot module to clear the write record of the on-write data structure subsequent to copying the first differential data set backup to the backup data storage device and wherein the first differential data set backup is configured as a first incremental data set backup and the first differential time stamp is configured as a first incremental time stamp, and the backup module is further configured to copy a second incremental time stamp and the data block indicated by the identifier of a write record recorded subsequent to the first incremental data set backup to the backup data storage device as a second incremental data set backup; and
   a restore module comprising executable code stored on the storage device, executed by the processor, and configured to recover the data set responsive to receiving a restore command comprising a data set identifier and a target time value, wherein if the data set identifier indicates the data set, the restore module is further configured to copy the full data set backup to the active data storage device and if the target time value is subsequent to or equivalent to the first differential time stamp to copy each data block of the first differential data set backup to the active data storage device overlaying the corresponding data block of the full data set backup.

9. A system to backup data, the system comprising:
   an active data storage device comprising a data set;
   a backup data storage device;
   a snapshot module comprising executable code stored on a storage device, executed by a processor, and configured to create an on-write data structure configured to receive a write record for a write to a data block in the data set, the write record comprising a data block identifier and record the write record for the write to the data block of the data set in the on-write data structure; and
   a backup module comprising executable code stored on the storage device, executed by the processor, and configured to copy the data set to the backup data storage device as a full data set backup and copy a first differential time stamp and the data block indicated by the data block identifier of the recorded write record to the backup data storage device as a first differential data set backup wherein the data set remains accessible on the active data storage device while copied, and direct the snapshot module to clear the write record of the on-write data structure subsequent to copying the first differential data set backup to the backup data storage device and wherein the first differential data set backup is configured as a first incremental data set backup and the first differential time stamp is configured as a first incremental time stamp, and the backup module is further configured to copy a second incremental time stamp and the data block identifier of a write record recorded subsequent to the first incremental data set backup to the backup data storage device as a second incremental data set backup; and a restore module comprising executable code stored on the storage device, executed by the processor, and configured to recover the data set responsive to receiving a restore command comprising a data set identifier and a target time value, wherein if the data set identifier indicates the data set, the restore module is further configured to copy the full data set backup to a target data storage device and if the target time value is subsequent to or equivalent to the first differential time stamp to copy each data block of the first differential data set backup to the target data storage device overlaying the corresponding data block of the full data set backup.

10. The system of claim 9, further comprising a block size module configured to determine a data block size for the write record of the on-write data structure.

11. The system of claim 9, wherein the restore module is configured to copy the full data set backup to the target data storage device, copy the data block of the first incremental data set backup to the target data storage device overlaying the corresponding data block of the full data set backup if the target time value is subsequent to or equivalent to the first incremental time stamp, and copy the data block of the second incremental data set backup to the target data storage device overlaying the corresponding data block of the full data set backup if the target time value is subsequent to or equivalent to the second incremental data time stamp.

12. The system of claim 9, wherein the first differential data set backup is configured as a first cumulative data set backup, the first differential time stamp is configured as a first cumulative time stamp, and wherein the backup module is configured to copy a second cumulative time stamp and the data block indicated by a write record recorded by the snapshot module subsequent to the full data set backup to the backup data storage device as a second cumulative data set backup, wherein the snapshot module maintains at least one cumulative write record in the on-write data structure.

13. The system of claim 12, wherein the restore module is configured to copy the full data set backup to the target data storage device, select the cumulative data set backup with the cumulative time stamp corresponding to the target time value such that the target time value is subsequent to or equal to the cumulative time stamp and the target time value is prior to the cumulative time stamp of each subsequent cumulative data set backup, and copy the data block of the selected cumulative data set backup to the target data storage device overlaying the corresponding data block of the full data set backup.

14. The system of claim 9, wherein the backup module is configured to periodically copy a differential time stamp and the data block indicated by the recorded write record of the on-write data structure to the backup data storage device as a plurality of differential data set backups configured as a plurality of temporal instances of the data set.

15. A program of machine-readable instructions stored on a storage device and executable by a digital processing apparatus to perform operations to backup data, the operations comprising:
  creating the on-write data structure comprising the write record for a write to a data block of the data set of an active data storage device, the write record comprising a data block identifier;
  copying the data set to a backup data storage device as a full data set backup wherein the data set remains accessible on the active data storage device;
  recording the write record for the write to the data block of the data set in the on-write data structure;
  copying the block indicated by the data block identifier of the recorded write record to the backup data storage device as a first differential data set backup, the first differential data set backup further comprising a first differential time stamp;
  clearing each write record of the on-write data structure subsequent to copying the first differential data set backup to the backup data storage device and wherein the first differential data set backup is configured as a first incremental data set backup and the first differential time stamp is configured as a first incremental time stamp; and
  copying a second incremental time stamp and the at least one data block of each write record recorded subsequent to the first incremental data set backup to the backup data storage device as a second incremental data set backup.

16. The program of machine-readable instructions of claim 15, wherein the instructions further comprise operations to determine a data block size for a write record of an on-write data structure.

17. The program of machine-readable instructions of claim 15, wherein the instructions further comprise operations to receive a restore command comprising a data set identifier and a target time value, copy the full data set backup to a target data storage device and copy the data block of the first differential data set backup to the target data storage device overlaying the corresponding data block of the full data set backup responsive to the restore command and if the target time value is subsequent to or equal to the first differential time stamp.

18. The program of machine-readable instructions of claim 17, wherein the instructions further comprise operations to copy a second cumulative time stamp and the data block of the recorded write record to the backup data storage device as a second cumulative data set backup and wherein the first differential data set backup is configured as a first cumulative data set backup and the first differential time stamp is configured as a first cumulative time stamp.

19. The program of machine-readable instructions of claim 18, wherein the instructions further comprise operations to copy the full data set backup to a target data storage device, select the cumulative data set backup corresponding to the target time value, and copy the data block of the selected cumulative data set backup to the target data storage device overlaying the corresponding data block of the full data set backup.

20. The program of machine-readable instructions of claim 15, wherein the instructions further comprise operations to copy the full data set backup to a target data storage device, copy the at the data block of the first incremental data set backup to the target data storage device overlaying the corresponding data block of the full data set backup if the target time value is subsequent to or equivalent to the first incremental time stamp, and copy the data block of the second incremental data set backup to the target data storage device overlaying the corresponding data block of the full data set backup if the target time value is subsequent to or equivalent to the second incremental time stamp.

21. A method for backing up data, the method comprising:
  creating an on-write data structure comprising the write record for a write to a data block of the data set of an active data storage device, the write record comprising a data block identifier;
  copying the data set to a backup data storage device as a full data set backup wherein the data set remains accessible on the active data storage device;

recording the write record for the write to the data block of the data set in the on-write data structure;

copying the block indicated by the data block identifier of the recorded write record to the backup data storage device as a first differential data set backup, the first differential data set backup further comprising a first differential time stamp;

receiving a restore command comprising a data set identifier and a target time value;

copying the full data set backup to a target data storage device;

copying the data block of the first differential data set backup to the target data storage device overlaying the corresponding data block of the full data set backup responsive to the restore command and if the target time value is subsequent to or equal to the first differential time stamp;

clearing the write record of the on-write data structure subsequent to copying the first differential data set backup to the backup data storage device and wherein the first differential data set backup is configured as a first incremental data set backup and the first differential time stamp is configured as a first incremental time stamp;

copying a second incremental time stamp and the data block of each write record recorded subsequent to the first incremental data set backup to the backup data storage device as a second incremental data set backup; and recovering the active data set by copying the full data set backup to a target data storage device, copying the data block of the first incremental data set backup to the target data storage device overlaying the corresponding data block of the full data set backup if the target time value is subsequent to or equivalent to the first incremental time stamp, and copying the data block of the second incremental data set backup to the target data storage device overlaying the corresponding data block of the full data set backup if the target time value is subsequent to or equivalent to the second incremental time stamp.

22. The method of claim 21, wherein the first differential time stamp is configured as a first cumulative time stamp and the first differential data set backup is configured as a first cumulative data set backup, the method further comprising copying a second cumulative time stamp and the data block of each recorded write record to the backup data storage device as a second cumulative data set backup, and copying the full data set backup to a target data storage device, selecting the cumulative data set backup corresponding to the target time value, and copying the data block of the selected cumulative data set backup to the target data storage device overlaying the corresponding data block of the full data set backup.

23. An apparatus to back up data, the apparatus comprising:

means for determining a data block size for a write record of an on-write data structure, the determining means comprising executable code stored on a storage device and executed by a processor;

means for creating the on-write data structure comprising the write record for a write to a data block of the data set of an active data storage device, the write record comprising a data block identifier and the creating means comprising executable code stored on the storage device and executed by the processor;

means for copying the data set to a backup data storage device as a full data set backup wherein the data set remains accessible on the active data storage device and the data set copying means comprising executable code stored on the storage device and executed by the processor;

means for recording the write record for the write to the data block of the data set in the on-write data structure, the recording means comprising executable code stored on the storage device and executed by the processor;

means for copying the block indicated by the data block identifier of the recorded write record to the backup data storage device as a first differential data set backup, the first differential data set backup further comprising a first differential time stamp, the block co in means comprising executable code stored on the storage device and executed by the processor;

means for clearing each write record of the on-write data structure subsequent to copying the first differential data set backup to the backup data storage device and wherein the first differential data set backup is configured as a first incremental data set backup, the first differential time stamp is configured as a first incremental time stamp, and the clearing means comprising executable code stored on the storage device and executed by the processor; and means for copying a second incremental time stamp and the at least one data block of each write record recorded subsequent to the first incremental data set backup to the backup data storage device as a second incremental data set backup, the second incremental time stamp copying means comprising executable code stored on the storage device and executed by the processor.

* * * * *